(12) United States Patent
Valdes et al.

(10) Patent No.: US 7,917,393 B2
(45) Date of Patent: Mar. 29, 2011

(54) PROBABILISTIC ALERT CORRELATION

(75) Inventors: Alfonso De Jesus Valdes, San Carlos, CA (US); Keith Skinner, Sunnyvale, CA (US)

(73) Assignee: SRI International, Inc., Menlo Park, CA (US)

( * ) Notice: Subject to any disclaimer, the term of this patent is extended or adjusted under 35 U.S.C. 154(b) by 1711 days.

(21) Appl. No.: 09/944,788

(22) Filed: Aug. 31, 2001

(65) Prior Publication Data

US 2002/0059078 A1   May 16, 2002

Related U.S. Application Data

(63) Continuation-in-part of application No. 09/711,323, filed on Nov. 9, 2000, which is a continuation-in-part of application No. 09/653,066, filed on Sep. 1, 2000.

(60) Provisional application No. 60/278,514, filed on Mar. 23, 2001.

(51) Int. Cl.
   *G06Q 30/00* (2006.01)
   *G06F 21/00* (2006.01)

(52) U.S. Cl. ............ 705/26; 705/50; 705/51; 705/52; 705/53; 705/54; 705/55; 705/56; 705/57; 705/58; 705/59; 709/223; 709/224; 709/225; 709/226

(58) Field of Classification Search .......... 705/50–59; 709/223–226
   See application file for complete search history.

(56) References Cited

U.S. PATENT DOCUMENTS

| | | | |
|---|---|---|---|
| 4,667,317 A * | 5/1987 | Baggen | 369/111 |
| 4,672,609 A | 6/1987 | Humphrey et al. | 371/21 |
| 4,773,028 A | 9/1988 | Tallman | 364/550 |
| 5,210,704 A | 5/1993 | Husseiny | 364/551.01 |
| 5,440,498 A * | 8/1995 | Timm | 340/541 |
| 5,440,723 A | 8/1995 | Arnold et al. | 395/181 |
| 5,475,365 A * | 12/1995 | Hoseit et al. | 340/522 |

(Continued)

FOREIGN PATENT DOCUMENTS

WO    99/13427    3/1999

(Continued)

OTHER PUBLICATIONS

Hartley, B., "Intrusion Detection Systems: What You Need to Know," Business Security Advisor Magazine, Doc # 05257, allegedly dated Sep. 1998, http://advisor.com/doc/05257, 7 pages, printed Jun. 10, 2003.

(Continued)

*Primary Examiner* — Calvin Loyd Hewitt, II
*Assistant Examiner* — Cristina Owen Sherr

(57) ABSTRACT

This invention uses probabilistic correlation techniques to increase sensitivity, reduce false alarms, and improve alert report quality in intrusion detection systems. In one preferred embodiment, an intrusion detection system includes at least two sensors to monitor different aspects of a computer network, such as a sensor that monitors network traffic and a sensor that discovers and monitors available network resources. The sensors are correlated in that the belief state of one sensor is used to update or modify the belief state of another sensor. In another embodiment of this invention, probabilistic correlation techniques are used to organize alerts generated by different sensors in an intrusion detection system. By comparing features of each new alert with features of previous alerts, rejecting a match if a feature fails to meet or exceed a minimum similarity value, and adjusting the comparison by an expectation that certain feature values will or will not match, the alerts can be grouped in an intelligent manner.

6 Claims, 9 Drawing Sheets

U.S. PATENT DOCUMENTS

| | | | | |
|---|---|---|---|---|
| 5,517,429 | A | * | 5/1996 | Harrison ........................ 342/378 |
| 5,539,659 | A | | 7/1996 | McKee et al. ................. 709/224 |
| 5,557,742 | A | | 9/1996 | Smaha et al. .................. 395/186 |
| 5,568,471 | A | | 10/1996 | Hershey et al. |
| 5,704,017 | A | | 12/1997 | Heckerman et al. |
| 5,706,210 | A | | 1/1998 | Kumano et al. ............... 709/224 |
| 5,737,319 | A | | 4/1998 | Croslin et al. |
| 5,748,098 | A | | 5/1998 | Grace |
| 5,790,799 | A | | 8/1998 | Mogul ........................... 709/224 |
| 5,878,420 | A | | 3/1999 | De la Salle ..................... 707/10 |
| 5,919,258 | A | | 7/1999 | Kayashima et al. .......... 713/201 |
| 5,922,051 | A | | 7/1999 | Sidey ............................. 709/223 |
| 5,940,591 | A | | 8/1999 | Boyle et al. ............... 395/187.01 |
| 5,974,237 | A | | 10/1999 | Shurmer et al. ............... 709/224 |
| 5,974,457 | A | | 10/1999 | Waclawshy et al. .......... 709/224 |
| 5,991,881 | A | | 11/1999 | Conklin et al. ............... 713/201 |
| 6,009,467 | A | | 12/1999 | Ratcliff et al. ................ 709/224 |
| 6,052,709 | A | | 4/2000 | Paul .............................. 709/202 |
| 6,067,582 | A | | 5/2000 | Smith et al. |
| 6,070,244 | A | | 5/2000 | Orchier et al. ................ 713/201 |
| 6,092,194 | A | | 7/2000 | Touboul |
| 6,119,236 | A | | 9/2000 | Shipley |
| 6,128,640 | A | * | 10/2000 | Kleinman ...................... 718/102 |
| 6,144,961 | A | | 11/2000 | De la Salle ..................... 707/10 |
| 6,192,392 | B1 | | 2/2001 | Ginter |
| 6,263,441 | B1 | | 7/2001 | Cromer et al. |
| 6,269,456 | B1 | | 7/2001 | Hodges et al. |
| 6,275,942 | B1 | | 8/2001 | Bernhard et al. |
| 6,279,113 | B1 | | 8/2001 | Vaidya |
| 6,298,445 | B1 | | 10/2001 | Shostack et al. |
| 6,311,274 | B1 | | 10/2001 | Day |
| 6,321,338 | B1 | | 11/2001 | Porras et al. |
| 6,324,656 | B1 | | 11/2001 | Gleichauf et al. |
| 6,353,385 | B1 | | 3/2002 | Molini et al. |
| 6,370,648 | B1 | | 4/2002 | Diep |
| 6,396,845 | B1 | | 5/2002 | Sugita ........................... 370/449 |
| 6,405,318 | B1 | | 6/2002 | Rowland |
| 6,408,391 | B1 | | 6/2002 | Huff et al. |
| 6,442,694 | B1 | | 8/2002 | Bergman et al. |
| 6,453,346 | B1 | * | 9/2002 | Garg et al. .................... 709/224 |
| 6,460,141 | B1 | | 10/2002 | Olden ........................... 712/201 |
| 6,477,651 | B1 | | 11/2002 | Teal |
| 6,484,315 | B1 | * | 11/2002 | Ziese ........................... 717/173 |
| 6,499,107 | B1 | | 12/2002 | Gleichauf et al. |
| 6,502,082 | B1 | | 12/2002 | Toyama et al. |
| 6,519,703 | B1 | | 2/2003 | Joyce ............................ 713/201 |
| 6,529,954 | B1 | | 3/2003 | Cookmeyer et al. |
| 6,532,543 | B1 | | 3/2003 | Smith et al. |
| 6,535,227 | B1 | | 3/2003 | Fox et al. |
| 6,546,493 | B1 | | 4/2003 | Magdych et al. |
| 6,553,378 | B1 | | 4/2003 | Eschelbeck |
| 6,560,611 | B1 | * | 5/2003 | Nine et al. ................. 707/104.1 |
| 6,584,455 | B1 | | 6/2003 | Hekmatpour |
| 6,681,331 | B1 | | 1/2004 | Munson et al. |
| 6,690,274 | B1 | * | 2/2004 | Bristol ........................... 340/506 |
| 6,701,459 | B2 | | 3/2004 | Ramanathan et al. |
| 6,704,874 | B1 | | 3/2004 | Porras et al. |
| 6,707,795 | B1 | * | 3/2004 | Noorhosseini et al. ....... 370/242 |
| 6,725,377 | B1 | | 4/2004 | Kouznetsov |
| 6,732,167 | B1 | | 5/2004 | Swartz et al. |
| 6,751,738 | B2 | | 6/2004 | Wesinger et al. |
| 6,826,697 | B1 | | 11/2004 | Moran |
| 6,839,850 | B1 | | 1/2005 | Campbell et al. |
| 6,947,726 | B2 | | 9/2005 | Rockwell |
| 6,950,947 | B1 | * | 9/2005 | Purtell et al. ..................... 726/12 |
| 6,971,028 | B1 | | 11/2005 | Lyle et al. |
| 7,051,369 | B1 | | 5/2006 | Baba |
| 7,096,495 | B1 | | 8/2006 | Warrier et al. |
| 7,096,502 | B1 | | 8/2006 | Fox et al. |
| 2002/0019870 | A1 | | 2/2002 | Chirashnya et al. |
| 2002/0032717 | A1 | | 3/2002 | Malan et al. ................... 709/105 |
| 2002/0032793 | A1 | | 3/2002 | Malan et al. ................... 709/232 |
| 2002/0032880 | A1 | | 3/2002 | Poletto et al. ....................... 714/4 |
| 2002/0035698 | A1 | | 3/2002 | Malan et al. ................... 713/201 |
| 2002/0138753 | A1 | | 9/2002 | Munson ......................... 713/200 |
| 2002/0144156 | A1 | | 10/2002 | Copeland, III ................ 713/201 |
| 2002/0194495 | A1 | | 12/2002 | Gladsone et al. |
| 2003/0037136 | A1 | | 2/2003 | Labovitz et al. .............. 709/224 |
| 2003/0070084 | A1 | | 4/2003 | Satomaa et al. |
| 2003/0145226 | A1 | | 7/2003 | Bruton, III et al. |
| 2003/0172166 | A1 | | 9/2003 | Judge et al. |
| 2005/0038881 | A1 | | 2/2005 | Ben-Itzhak |
| 2005/0246776 | A1 | | 11/2005 | Chawro et al. |

FOREIGN PATENT DOCUMENTS

| | | | |
|---|---|---|---|
| WO | | 99/57626 | 11/1999 |
| WO | WO | 99/57625 | 11/1999 |
| WO | | 00/10278 | 2/2000 |
| WO | | 00/25214 | 5/2000 |
| WO | | 00/25527 | 5/2000 |
| WO | WO | 00/25527 | * 5/2000 |
| WO | | 00/34867 | 6/2000 |
| WO | | 02/101516 | 12/2002 |
| WO | WO | 02/101516 A2 | 12/2002 |
| WO | WO | 03/077071 | 9/2003 |

OTHER PUBLICATIONS

Hurwicz, M., "Cracker Tracking: Tighter Security with Intrusion Detection," BYTE.com, allegedly dated May 1998, http://www.byte.com/art/9805/sec20/art1.htm, 8 pages, printed Jun. 10, 2003.

"Networkers, Intrusion Detection and Scanning with Active Audit," Session 1305, © 1998Cisco Systems, http://www.cisco.com/networkers/nw99_pres/1305.pdf, 0893-04F9_c3.scr, printed Jun. 10, 2003.

Paller, A., "About the SHADOW Intrusion Detection System" Linux Weekly News, allegedly dated Sep. 1998, http://lwn.net/1998/0910/shadow.html, 38 pages, printed Jun. 10, 2003.

Cisco Secure Intrusion Detection System, Release 2.1.1, NetRanger User's Guide, Version 2.1.1, © 1998, Cisco Systems, Inc., allegedly released on Apr. 1998, http://www.cisco.com/univercd/cc/td/doc/product/iaabu/csids/csids3/index.htm, printed Jun. 10, 2003, 334 pages.

Cisco Secure Intrusion Detection System 2.1.1 Release Notes, Table of Contents, Release Notes for NetRanger 2.1.1, © 1992-2002, Cisco Systems, Inc., , allegedly posted Sep. 28, 2002, 29 pages, http://www.cisco.com/univercd/cc/td/doc/product/iaabu/csids/csids3/nr11new.htm, printed Jun. 10, 2003.

R. Power, et al., "CSI Intrusion Detection System Resource", allegedly dated Jul. 1998, http://216.239.57.100/search?q=cache:gvTCojxD6nMJ:www.gocsi.com/ques.htm+site:www.gocsi.com+ques&hl=en&ie=UTF-8, printed Jun. 16, 2003.

Boyen, et al., "Tractable Inference for Complex Stochastic Processes," Proceedings of the 14th Annual Conference on Uncertainty in Artificial Intelligence (UAI-98), p. 33-42, Madison, WI, Jul. 24-26, 1998.

Copeland, J., "Observing Network Traffic—Techniques to Sort Out the Good, the Bad, and the Ugly," http://www.csc.gatech.edu/~copeland/8843/slides/Analyst-011027.ppt, allegedly 2001.

Debar, et al., "Towards a Taxonomy of Intrusion-Detection Systems," Computer Networks 31 (1999), 805-822.

Debar et al., "A Neural Network Component for an Intrusion Detection System," © 1992 IEEE.

Denning et al, "Prototype IDES: A Real-Time Intrusion-Detection Expert System," SRI Project ECU 7508, SRI International, Menlo Park, California, Aug. 1987.

Denning et al., "Requirements and Model for IDES—A Real-Time Intrusion-Detection Expert System," SRI Project 6169, SRI International, Menlo Park, CA, Aug. 1985.

Denning, "An Intrusion-Detection Model," SRI International, Menlo Park, CA Technical Report CSL-149, Nov. 1985.

Dowell, "The Computerwatch Data Reduction Tool," AT&T Bell Laboratories, Whippany, New Jersey.

Farshchi, J., "Intrusion Detection FAQ, Statistical based approach to Intrusion Detection," http://www.sans.org/resources/idfaq/statistic_ids.php, date unknown, printed Jul. 10, 2003.

Fox, et al., "A Neural Network Approach Towards Intrusion Detection," Harris Corporation Government Information Systems Division, Melbourne, FL, Jul. 2, 1990.

Garvey, et al., "Model-Based Intrusion Detection," Proceedings of the 14th national Computer Security Conference, Washington, DC, Oct. 1991.

Garvey, et al., "An Inference Technique for Integrating Knowledge from Disparate Sources," Proc. IJCAI, Vancouver, BC, Aug. 1981, 319-325.

Goan, T., "A Cop on The Beat, Collecting and Appraising Intrusion Evidence," Communication of the ACM, 42(7), Jul. 1999, 46-52.

Heberlein, et al., "A Network Security Monitor," Proceedings of the IEEE Symposium on Security and Privacy, May 7-9, 1990, Oakland, CA, pp. 296-304, IEEE Press.

Ilgun et al., State Transition Analysis: A Rule-Based Intrusion Detection Approach, IEEE Transactions on Software Engineering, vol. 21, No. 3, Mar. 1995.

Internet Security Systems, "Intrusion Detection for the Millennium," ISS Technology Brief, Date Unknown, p. 1-6.

Jackson, et al., "An Expert System Application For Network Intrusion Detection," Proceedings of the 14th National Computer Security Conference, Washington, DC, Oct. 1-4, 1991.

Javitz et al., "The SRI IDES Statistical Anomaly Detector," Proceedings, 1991 IEEE Symposium on Security and Privacy, Oakland, California, May 1991.

Jarvis et al., The NIDES Statistical Component Description and Justification, SRI International Annual Report A010, Mar. 7, 1994.

Kaven, "The Digital Dorman," PC Magazine, Nov. 16, 1999.

Lankewicz, et al., "Real-time Anomaly Detection Using a Nonparametric Pattern Recognition Approach", Proceedings of the 7th Annual Computer Security Applications Conference, San Antonio, Texas, 1991, IEEE Press.

Liepins, et al., "Anomaly Detection; Purpose and Framework," US DOE Office of Safeguards and Security.

Lindquist, et al., "Detecting Computer and Network Misuse Through the Production-Based Expert System Toolset (P-BEST)," Oct. 25, 1998.

Lippmann, et al., "Evaluating Intrusion Detection Systems: The 1998 DARPA Off-line Intrusion Detection Evaluation," Proceedings of the 2000 DARPA, Information Survivability Conference and Exposition, Jan. 25-27, 2000, Hilton Head, SC, vol. 2, pp. 1012-1035, IEEE Press.

Lunt et al., "An Expert System to Classify and Sanitize Text," SRI International, Computer Science Laboratory, Menlo Park, CA.

Lunt, "A Survey of Intrusion Detection Techniques," Computers & Security, 12 (1993) 405-418.

Lunt, "Automated Audit Trail Analysis and Intrusion Detection: A Survey," Proceedings of the 11th National Computer Security Conference, Baltimore, MD, Oct. 1988.

Lunt et al., "A Prototype Real-Time Intrusion-Detection Expert System," Proceedings of the 1988 IEEE Symposium on Security and Privacy, Apr. 1988.

Lunt et al., "Knowledge-Based Intrusion Detection Expert System," Proceedings of the 1988 IEEE Symposium on Security and Privacy, Apr. 1988.

Miller, L., "A Network Under Attack, Leverage Your Existing Instrumentation to Recognize and Respond to Hacker Attacks," http://www.netscout.com/files/Intrusion_020118.pdf, Date Unknown, p. 1-8.

Munson, et al., "Watcher: The Missing Piece of the Security Puzzle," Proceedings of the 17th Annual Computer Security Applications Conference (ACSAC'01), Dec. 10-14, 2001, New Orleans, LA, pp. 230-239, IEEE Press.

NetScreen, Products FAQ, http://www.netscreen.com/products/faq.html, Date Unknown.

Pearl, J., "Probabilistic Reasoning in Intelligent Systems: Networks of Plausible Inference," Morgan Kaufmann Publishers, Sep. 1988.

Porras, et al., "Live Traffic Analysis of TCP/IP Gateways," Proc. 1998 ISOC Symp. on Network and Distributed Systems Security, Dec. 12, 1997, 1-13.

Porras et al, "EMERALD: Event Monitoring Enabling Responses to Anomalous Live Disturbances," 20th NISSC—Oct. 9, 1997.

Porras et al., Penetration State Transition Analysis A Rule-Based Intrusion Detection Approach, © 1992 IEEE.

Sebring et al., Expert Systems in Intrusion Detection: A Case Study.

Shieh et al., A Pattern-Oriented Intrusion-Detection Model and Its Application © 1991 IEEE.

Skinner, "EMERALD TCP Statistical Analyzer 1998 Evaluation Results," http://www.sdl.sri.com/emerald/98-eval-estat/index.html, Allegedly dated Jul. 9, 1999.

Smaha, Haystack: An Intrusion Detection System: © 1988 IEEE Computer Society Press: Proceedings of the Fourth Aerospace Computer Security Application Conference, 1988, pp. 37-44.

Snapp, Signature Analysis and Communication Issues in a Distributed Intrusion Detection System,: Thesis 1991.

Snapp et al., "DIDS (Distributed Intrusion Detection System)—Motivation, Architecture and An Early Prototype," Computer Security Laboratory, Division of Computer Science, Unic. of California, Davis, Davis, CA.

SRI/Stanford, "Adaptive Model-Based Monitoring and Threat Detection," Information Assurance BAA 98-34.

Staniford-Chen, et al., "GrIDS- A Graph Based Intrusion Detection System for Large Networks," Proceedings of the 19th National Information Systems Security Conference, vol. 1, pp. 361-370, Oct. 1996.

Tener, "Discovery: An Expert System in the Commercial Data Security Environment", Fourth IFIP Symposium on Information Systems Security, Monte Carlo, Dec. 1986.

Tener, "AI & 4GL: Automated Detection and Investigation Tools," Computer Security in the Age of Information, Proceedings of the Fifth IFIP International Conference on Computer Security, W.J. Caelli (ed.).

Teng et al., "Adaptive Real-Time Anomaly Detection Using Inductively Generated Sequential Patterns," © 1990.

Vaccaro et al., "Detection of Anomalous Computer Session Activity," © 1989 IEEE.

Valdes, et al., "Adaptive, Model-based Monitoring for Cyber Attack Detection," Proceedings of Recent Advances in Intrusion Detection 2000 (RAID 2000), H. Debar, L. Me, F. Wu (Eds), Toulouse, France, Springer-Verlag LNCS vol. 1907, pp. 80-92, Oct. 2000.

Valdes, A., Blue Sensors, Sensor Correlation, and Alert Fusion, http://www.raid-symposium.org/raid2000/Materials/Abstracts/41/avaldes_raidB.pdf, Oct. 4, 2000.

Valdes, et al., "Statistical Methods for Computer Usage Anomaly Detection Using NIDES (Next-Generation Intrusion Detection Expert System)," 3rd International Workshop on Rough Sets and Soft Computing, San Jose CA 1995, 306-311.

Weiss, "Analysis of Audit and Protocol Data using Methods from Artificial Intelligence," Siemens AG, Munich, West Germany.

Wimer, S., "The Core of CylantSecure," White Papers, http://www.cylant.com/products/core.html, Date Unknown, Alleged © 1999-2003 Cylant Inc., pp. 1-4.

Winkler, "A UNIX Prototype for Intrusion and Anomaly Detection in Secure Networks," © Planning Research Corp. 1990.

Zhang, et al., "A Hierarchical Anomaly Network Intrusion Detection System using Neural Network Classification," Proceedings of the 2001 WSES International Conference on Neural Networks and Applications (NNA'01), Puerto de la Cruz, Canary Islands, Spain, Feb. 11-15, 2001.

First Amended Complaint for Patent Infringement; Demand for Jury; *SRI International, Inc. v. Internet Security Systems, Inc. And Symantec Corporation*, Case No. 04-1199-SLR, pp. 1-8, believed to have been filed on May 23, 2005.

Symantec Corporation's Answer and Counterclaims to SRI International Inc.'s First Amended Complaint; *SRI International, Inc. v. Internet Security Systems, Inc. and Symantec Corporation*, Case No. 04-1199 (SLR), pp. 1-15, Certificate of Service dated May 23, 2003.

Answer and Counterclaims of Internet Security Systems, Inc., A Georgia Corporation; *SRI International, Inc. v. Internet Security Systems, Inc. and Symantec Corporation*, C.A. No. 04-1199 (SLR), pp. 1-22,Certificate of Service dated May 23, 2005.

Answer and Counterclaims of Internet Security Systems, Inc., A Delaware Corporation; *SRI International, Inc. v. Internet Security Systems, Inc. and Symantec Corporation*, C.A. No. 04-1199 (SLR), pp. 1-22, Certificate of Service dated May 23, 2005.

Anderson, D. et al., "Next-generation Intrusion Detection Expert System (NIDES) A Summary," May 1995.

Anderson, et al., "Next-generation Intrustion Detection Expert System (NIDES) Software Users Manual", Dec. 1994.

Cheeseman, et al., "Bayesian Classification (AutoClass): Theory and Results," in Advances in Knowledge Discovery and Data Mining, Usama M. Fayyad, Gregory Piatetsky-Shapiro, Padhraic Smyth, & Ramasamy Uthurusamy, Eds. AAAI Press/MIT Press, 1996. p. 61-83.

Decasper, et al., "Router Plugins A Software Architecture for Next Generation Routers," Proceedings of the ACM SIGCOMM '98 conference on Applications, technologies, architectures, and protocols for computer communication, Vancouver, British Columbia, Canada, pp. 229-240.

DuMouchel, W., "Computer Intrusion Detection Based on Bayes Factors for Comparing Command Transition Probabilities," NISS, Technical Report No. 91, Feb. 1999.

Frank, J., "Artificial Intelligence and Intrusion Detection: Current and Future Directions," Division of Computer Science, University of California at Davis, Jun. 1994.

Hoagland, et al., "Viewing IDS Alerts: Lessons from SnortSnarf," in Proceedings of DISCEX II, Jun. 2001, 374-386.

Lindquist, et al., "Detecting Computer and Network Misuse Through the Production-Based Expert System Toolset (P-BEST)," in Proceedings of the 1999 Symposium on Security and Privacy, Oakland, CA May 9-12, 1999.

Makris, J., "Firewall Services: More Bark Than Bite," Data Communications, 28 (3), Mar. 1999, 36-50.

Neumann, et al., "Experience with EMERALD to Date," Proceedings of the Workshop on Intrusion Detection and Network Monitoring, 73-80, 1999.

Petersen, K., "IDA- Intrustion Dection Alert," Proc. of the IEEE Annual International Computer Software and Applications Conference, Chicago, IL, Sep. 1992, 308-311.

Rowland, C., "Network Attack Trend Analysis," allegedly dated Nov. 22, 1997, Newsgroups: muc.list.bugtraq.

Ryan, et al., "Intrusion Detection with Neural Networks," Advances in Neural Information Processing Systems 10, Cambridge, MA, MIT Press, 1998.

Complaint for Declaratory Judgment, *Internet Security Systems, Inc., v. SRI International, Inc.*, US District Court, Northern District of Georgia, Civil Action No. 104 CV 2402, filed Aug. 17, 2004.

Complaint for Patent Infringement; Demand for Jury, *SRI International, Inc. v. Internet Security Systems, Inc, etal.*, US District Court, District of Delaware, Case No. 04-1199, Filed Aug. 26, 2004.

The RealSecure 1.2 Manual web.archive.org/web/19970709202745/www.iss.net/eval/manuals.html, alleged dated Jul. 9, 1997.

"Real-time attack recognition and response: A solution for tightening network security", Internet Security Systems, web.archive.org/web/19970721183811/iss.net/prod/whitepaper.html, allegedly dated Jul. 21, 1997.

Roesch, M., "SNORT—Lightweight Intrusion Detection for Networks," Proceedings of LISA '99: 13th Systems Administration Conference, Nov. 7-12, 1999, Seattle, WA 229-238.

Symantec Corporation's Answer and Counterclaims to SRI International, Inc.'s Complaint, *SRI International, Inc. v. Internet Security Systems, Inc. etal.*, US District Court, District of Delaware, Case No. 04-1199, Filed Oct. 15, 2004.

Joint Claim Construction Statement, *SRI International, Inc., a California Corporation v. Internet Security Systems, Inc., a Delaware Corporation, Internet Security Systems, Inc., a Georgia Corporation, and Symantec Corporation a Delaware Corporation*, (13 pages), Certificate of Service dated Mar. 17, 2006.

Symantec Corporation's Second Supplemental Responses to SRI International, Inc.'s Interrogatories Nos. 6 and 11, *SRI International, Inc., a California Corporation v. Internet Security Systems, Inc., a Delaware Corporation, Internet Security Systems, Inc., a Georgia Corporation and Symantec Corporation, a Delaware Corporation*, pp. 1-22, Dated Nov. 15, 2005.

Exhibit A-1 to the Symantec Corporation's Second Supplemental Responses to SRI International, Inc.'s Interrogatories Nos. 6 and 11, EMERALD: Event Monitoring Enabling Responses to Anomalous Live Disturbances, "EMERALD 1997", EEMERALD 1997 Invalidates the Indicated Claims Under 35 U.S.C. § 102 (b), pp. 1-51, Nov. 15, 2005.

Exhibit A-2 to the Symantec Corporation's Second Supplemental Responses to SRI International, Inc.'s Interrogatories Nos. 6 and 11, Analysis and Response for Intrusion Detection in Large Networks-Summary for CMAD Workshop, "EMERALD-CMAD" , EMERALD—CMAD Invalidates the Indicated Claims Under 35 U.S.C. § 102 (b) and/or 103, pp. 1-33, Nov. 15, 2005.

Exhibit A-3 to the Symantec Corporation's Second Supplemental Responses to SRI International, Inc.'s Interrogatories Nos. 6 and 11, EMERALD: Event Monitoring Enabling Responses to Anomalous Live Disturbances Conceptual Overview, "EMERALD- Conceptual Overview", EMERALD—Conceptual Overview Invalidates the Indicated Claims Under 35 U.S.C. § 102 (b) and/or 103, pp. 1-34, Nov. 15, 2005.

Exhibit A-4 to the Symantec Corporation's Second Supplemental Responses to SRI International, Inc.'s Interrogatories Nos. 6 and 11, Conceptual Design and Planning for EMERALD: Event Monitoring Enabling Responses to Live Disturbances, "EMERALD—Conceptual Design 1997", EMERALD—Conceptual Design 1997 Invalidates the Indicated Claims Under 35 U.S.C. § 102 (b) and/or 103 pp. 1-56, Nov. 15, 2005.

Exhibit A-5 to the Symantec Corporation's Second Supplemental Responses to SRI International, Inc.'s Interrogatories Nos. 6 and 11, Live Traffic Analysis of TCP/IP Gateways, "EMERALD—Live Traffic Analysis", EMERALD—Live Traffic Analysis Invalidates the Indicated Claims Under 35 U.S.C. § 102 (b), pp. 1-44, Nov. 15, 2004.

Exhibit A-6 to the Symantec Corporation's Second Supplemental Responses to SRI International, Inc.'s Interrogatories Nos. 6 and 11, Next Generation Intrusion Detection Expert System (NIDES) a Summary, "Network NIDES", Network NIDES Invalidates the Indicated Claims Under 35 U.S.C. § 102 (b), pp. 1-40, Nov. 15, 2005.

Exhibit A-7 to the Symantec Corporation's Second Supplemental Responses to SRI International, Inc.'s Interrogatories Nos. 6 and 11, Scalable Intrusion Detection for the Emerging Network, "Ji-Nao", Each of Ji-Nao and Ji-Nao Slides Invalidate the Indicated Claims Under 5 U.S.C. § 102 (b), pp. 1-76, Nov. 15, 2005.

Exhibit A-8 to the Symantec Corporation's Second Supplemental Responses to SRI International, Inc.'s Interrogatories Nos. 6 and 11, a Network Security Monitor, "NSM", NSM Invalidates the Indicated Claims Under 35 U.S.C. § 102 (b), pp. 1-9, Nov. 15, 2005.

Opening Brief for Plaintiff-Appellant, United States Court of Appeals for the Federal Circuit, *SRI International, Inc. v. Internet Security Systems, Inc. and Symantec Corporation* (2007-1065), Jan. 23, 2007.

Brief for Defendants-Appellees, United States Court of Appeals for the Federal Circuit, *SRI International, Inc. v. Internet Security Systems, Inc. and Symantec Corporation* (2007-1065), Mar. 12, 2007.

Opinion, United States Court of Appeals for the Federal Circuit, *SRI International, Inc. v. Internet Security Systems, Inc. and Symantec Corporation* (2007-1065), Jan. 8, 2008.

Defendants-Appellees' Combined Petition for Panel Rehearing and Rehearing En Banc, United States Court of Appeals for the Federal Circuit, *SRI International, Inc. v. Internet Security Systems, Inc. and Symantec Corporation* (2007-1065), Jan. 22, 2008.

Plaintiff-Appelant SRI International, Inc.'s Response to Petition for Panel Rehearling and Rehearing En Banc, United States Court of Appeals for the Federal Circuit, Case 04-CV-1199, *SRI International, Inc. v. Internet Security Systems* (Delaware), *Internet Security Systems, Inc.* (Georgia), *and Symantec Corporation*, Feb. 8, 2008.

Rebuttal Report of Dr. George Kesidis on Validity, In the United States District Court for the District of Delaware, *SRI International, Inc. v. Internet Security Systems, Inc. and Symantec Corporation* (C.A. No. 04-1199 (SLR)), May 16, 2006.

SRI International, Inc.'s Responses to Defendant ISS-GA's Second Set of Interrogatories [Nos. 19-20] and SRI's Third Supplemental Response to ISS-GA's Interrogatory No. 17, In the United States District Court for the District of Delaware, *SRI International, Inc. v. Internet Security Systems, Inc. and Symantec Corporation* (C.A. No. 04-1199 (SLR)), Dec. 15, 2005.

SRI International, Inc.'s Supplemental Response to Interrogatories No. 12 and No. 15, In the United States District Court for the District of Delaware, *SRI International, Inc. v. Internet Security Systems, Inc. and Symantec Corporation* (C.A. No. 04-1199 (SLR)), Dec. 15, 2005.

SRI International Inc.'s Opening Brief in Support of its Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jun. 16, 2006.
Defendant's Joint Opposition to SRI International Inc.'s Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jun. 30, 2006.
SRI International Inc.'s Reply in Support of its Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jul. 10, 2006.
Declaration of Phillip A. Porras, Jul. 30, 2006.
Declaration of Kyle Wagner Compton, Jul. 30, 2006.
Deposition of Stephen G. Kunin, Jun. 9, 2006.
Order Granting in Part and Denying in Part DI 286 MSJ Re: Non-Infringement DI 291 MSJ, issued by United States District Court for the District of Delaware, *SRI International, Inc. v. Internet Security Systems, Inc.*, Civ No. 04-1199-SLR, Oct. 17, 2006, consists of 1 unnumbered page.
Order Denying DI 270 MPSJ finding as Moot DI 276 and 279, issued by United States District Court for the District of Delaware, *SRI International, Inc. v. Internet Security Systems, Inc.*, Civ No. 04-1199-SLR, Oct. 17, 2006, consists of 2 unnumbered pages.
Memorandum Order Re: Disputed Claim Language, issued by United States District Court for the District of Delaware, *SRI International, Inc. v. Internet Security Systems, Inc.*, Civ No. 04-1199-SLR, Oct. 17, 2006, pp. 1-8.
Memorandum Opinion issued by United States District Court for the District of Delaware, *SRI International, Inc. v. Internet Security Systems, Inc.*, Civ No. 04-1199-SLR, Oct. 17, 2006, consists of 17 pages.
Memorandum Opinion issued by United States District Court for the District of Delaware, *SRI International, Inc. v. Internet Security Systems, Inc.*, Civ No. 04-1199-SLR, Oct. 17, 2006, consists of 27 pages.
CheckPoint Software Technologies, Ltd., "Getting Started with Check Point RealSecure", Jan. 2000, pp. 1-17.
CheckPoint Software Technologies, Ltd., "Check Point RealSecure Network Engine User Guide", Jan. 2000.
Elson, David, "Intrustion Detection, Theory and Practice", Mar. 2000, <http://online.securityfocus.com/infocus/1203>.
ICSAlabs, "Intrusion Detection System Buyer's Guide", Dec. 1999.
SRI's Opening Brief in Support of its Motion for Partial Summary Judgment of No Anticipation by the "EMERALD 1997" Publication, In the United States District Court for the District of Delaware, *SRI International, Inc. v. Internet Security Systems, Inc. and Symantec Corporation* (C.A. No. 04-1199 (SLR)), Jun. 16, 2006.
Defendant's Joint Opposition to SRI International, Inc.'s Motion for Partial Summary Judgment of No Anticipation by the "EMERALD 1997" Publication, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Reply in Support of its Motion for Partial Summary Judgment of No Anticipation by the "EMERALD 1997" Publication, In the United States District Court for the District of Delaware, *SRI International, Inc. v. Internet Security Systems, Inc. and Symantec Corporation* (C.A. No. 04-1199 (SLR)), Jul. 10, 2006.
SRI International, Inc.'s Opening Brief in Support of its Motion for Partial Summary Judgment That the Live Traffic Article is not a Section 102(b) Printed Publication, In the United States District Court for the District of Delaware, *SRI International, Inc. v. Internet Security Systems, Inc. and Symantec Corporation* (C.A. No. 04-1199 (SLR)), Jun. 16, 2006.
Answering Brief of Defendants ISS and Symantec to SRI's Motion for Partial Summary Judgment That the Live Traffic Article is Not a Section 102(b) Printed Publication, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Reply in Support of its Motion for Partial Summary Judgment That the Live Traffic Article is not a Section 102(b) Printed Publication, In the United States District Court for the District of Delaware, *SRI International, Inc. v. Internet Security Systems, Inc. and Symantec Corporation* (C.A. No. 04-1199 (SLR)), Jul. 10, 2006.
ISS's Opening Brief in Support of Their Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Opposition to ISS's Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jul. 17, 2006.
ISS's Reply Brief in Support of Its Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jul. 24, 2006.
Opening Brief in Support of Joint Motion for Summary Judgment of Invalidity Pursuant to 35 U.S.C. 102 & 103 of Defendants ISS and Symantec, In the United States District Court for the District of Delaware, *SRI International, Inc. v. Internet Security Systems, Inc. and Symantec Corporation* (C.A. No. 04-1199 (SLR)), Jun. 16, 2006.
SRI International Inc.'s Response to Defendant's Joint Motion for Summary Judgment of Invalidity Pursuant to 35 U.S.C. 102 & 103, In the United States District Court for the District of Delaware, *SRI International, Inc. v. Internet Security Systems, Inc. and Symantec Corporation* (C.A. No. 04-1199 (SLR)), Jun. 30, 2006.
Defendants' Joint Reply Brief in Support of Their Motion for Summary Judgment of Invalidity Pursuant to 35 U.S.C. 102 & 103, In the United States District Court for the District of Delaware, *SRI International, Inc. v. Internet Security Systems, Inc. and Symantec Corporation* (C.A. No. 04-1199 (SLR)), Jul. 19, 2006.
Frank Feather, Fault Detection in an Ethernet Network via Anomaly Detectors, Ph.D. Thesis, Carnegie Mellon University, Order No. 9224199, 1992.
Archived Pages from the Haystack Website.
Peter G. Neumann and Alfonso Valdes, Analysis and Response for Intrusion Detection in Large Networks, Summary for Intrusion Detection Workshop, Santa Cruz, CA, Aug. 26-28, 1996.
Shostack, A., An overview of SHTTP, pp. 1-7, May 1995.
Radlan, "Intrusion Detection, Extend the Monitoring and Protection of Your Network", Radlan White Paper, pp. 1-7, Feb. 1999.
Almgren, et al., "A lightweight Tool for Detecting Web Server Attacks," Network and Distributed Systems Security ( NDSS 2000) Symposium Proceedings, pp. 157-170, 2000. Provided is marked as pp. 1-14.
Almgren, et al., "Application-Integrated Data Collection for Security Monitoring," From Recent Advances in Intrusion Detection (RAID 2001) Springer, Davis, California, pp. 22-36 Oct. 2001(comprises of pp. 1-21).
Daniels, et al. "A network Audit System for Host-based Intrusion Detection (NASHID) in Linux," 16th annual Computer Security Application Conference (ACSAC 00) pp. 1-10, Dec. 2000.
Daniels, et al. "Identification of Host Audit Data to Detect Attacks on Low-Level IP Vulnerabilities," J. Computer Security, 7 (1), pp. 3-35, 1999.
Dayioglu, "*APACHE Intrusion Detection Module,*" http://yunus.hacettepe.edu.tr/~burak/mod_id, pp. 1-6, date Unknown, Downloaded Nov. 10, 2003.
Hollander, Y., "*The Future of Web Server Security: Why your web site is still vulnerable to attack,*" http://www.cgisecurity.com/lib/wpfuture.pdf, pp. 1-9, allegedly posted 2000.
Lindqvist, et al, "eXpert-BSM: A host-based Intrusion Detection Solution for Sun Solaris," Proc 17th Annual Computer security Application Conference, p. 240-251, Dec. 2001.(provided comprises of pp. 1-12).
ISS, "Introduction to RealSecure Version 3.0", pp. 1-46, 1999.

Network Assoc., Next Generation Intrusion Detection In High-Speed Networks, pp. 1-18, 1999.
Exhibit 14 to the Supplemental Responses and Objections of ISS-GA and ISS-DE to SRI's Interrogatory Nos. 6 & 11, The Network Flight Recorder System Invalidates the Indicated Claims Under 35 U.S.C. § 102 (b) and/or 103, pp. 1-73, Nov. 15, 2005.
Exhibit 15 to the Supplemental Responses and Objections of ISS-GA and ISS-DE to SRI's Interrogatory Nos. 6 & 11, Netstalker and HP Openview Invalidate the Indicated Claims Under 35 U.S.C. § 102 (b) and/or 103, pp. 1-21, Nov. 15, 2005.
Exhibit 16 to the Supplemental Responses and Objections of ISS-GA and ISS-DE to SRI's Interrogatory Nos. 6 & 11, HP Openview and the Internet Standards Invalidate the Indicated Claims Under 35 U.S.C. § 102 (b) and/or 103, pp. 1-26, Nov. 15, 2005.
Exhibit 17 to the Supplemental Responses and Objections of ISS-GA and ISS-DE to SRI's Interrogatory Nos. 6 & 11,"Network Level Intrusion Detection System" (Aug. 1990) Invalidates the Indicated Claims Under 35 U.S.C. § 102 (b), pp. 1-22, Nov. 15. 2005.
Exhibit 18 to the Supplemental Responses and Objections of ISS-GA and ISS-DE to SRI's Interrogatory Nos. 6 & 11, US Patent No. 5,825,750 (Thompson) Invalidates the Indicated Claims Under 35 U.S.C. § 102 (a) and 102 (e), pp. 1-21, Nov. 15, 2005.
Exhibit 19 to the Supplemental Responses and Objections of ISS-GA and ISS-DE to SRI's Interrogatory Nos. 6 & 11,"Fault Detection in an Ethernet Network Via Anomaly Detectors" Invalidates the Indicated Claims Under 35 U.S.C. § 102 (b), pp. 1-17, Nov. 15, 2005.
Exhibit 20 to the Supplemental Responses and Objections of ISS-GA and ISS-DE to SRI's Interrogatory Nos. 6 & 11, Stake Out Network Surveillance Invalidates the Indicated Claims Under 35 U.S.C. § 102 (b), pp. 1-24, Nov. 15, 2005.
Exhibit 21 to the Supplemental Responses and Objections of ISS-GA and ISS-DE to SRI's Interrogatory Nos. 6 & 11, EMERALD 1997, Intrusive Activity 1991, and NIDES 1994 Invalidate the Indicated Claims Under 35 U.S.C. § 102 (b) or 103,pp. 1-62, Nov. 15, 2005.
Exhibit 22 to the Supplemental Responses and Objections of ISS-GA and ISS-DE to SRI's Interrogatory Nos. 6 & 11, Automated Information System—AIS Invalidates the Indicated Claims Under 35 U.S.C. § 102 (b), pp. 1-15, Nov. 15, 2005.
Exhibit 23 to the Supplemental Responses and Objections of ISS-GA and ISS-DE to SRI's Interrogatory Nos. 6 & 11, Comparison of Listed Publications to Claims-at-Issue of SRI's Patents-in-Suit for 35 U.S.C. § 103, pp. 1-127, Nov. 15, 2005.
Second Supplemental Responses and Objections of ISS-GA and ISS-DE to SRI's Interrogatory No. 11,*SRI International, Inc., a California Corporation v. Internet Security Systems, Inc., a Delaware Corporation, Internet Security Systems, Inc., a Georgia Corporation and Symantec Corporation a Delaware Corporation*, pp. 1-17, Certificate of Service dated Mar. 28, 2006.
Symantec Corporation's Fifth Supplemental Responses to SRI International, Inc.'s Interrogatory No. 11, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-15, dated Mar. 28, 2006.
Mark Miller, Managing Internetworks with SNMP, 2nd Edition, 1997.
NFR Version 1.0beta2 Source Code.
Exhibit 7 to the Supplemental Responses and Objections of ISS-GA and ISS-DE to SRI's Interrogatory Nos. 6 & 11, Ji-Nao Invalidates the Indicated Claims Under 35 U.S.C.§ 102 (b), pp. 1-100, Nov. 15, 2005.
Exhibit 8 to the Supplemental Responses and Objections of ISS-GA and ISS-DE to SRI's Interrogatory Nos. 6 & 11, NSM Invalidates the Indicated Claims Under 35 U.S.C.§ 102 (b), pp. 1-17, Nov. 15, 2005.
Exhibit 9 to the Supplemental Responses and Objections of ISS-GA and ISS-DE to SRI's Interrogatory Nos. 6 & 11, DIDS Invalidates the Indicated Cliams Under 35 U.S.C.§ 102 (b), pp. 1-114, Nov. 15, 2005.
Exhibit 10 to the Supplemental Responses and Objections of ISS-GA and ISS-DE to SRI's Interrogatory Nos. 6 & 11, ISM and DIDS Invalidate the Indicated Claims Under 35 U.S.C. § 102 (b) or 103. pp. 1-91, Nov. 15, 2005.
Exhibit 11 to the Supplemental Responses and Objections of ISS-GA and ISS-DE to SRI's Interrogatory Nos. 6 & 11, GrIDS Invalidates the Indicated Claims Under 35 U.S.C.§ 102 (b), pp. 1-41, Nov. 15, 2005.
Exhibit 12 to the Supplemental Responses and Objections of ISS-GA and ISS-DE to SRI's Interrogatory Nos. 6 & 11, NETRANGER Invalidates the Indicated Claims Under 35 U.S.C.§ 102 (b), pp. 1-32, Nov. 15, 2005.
Exhibit 13 to the Supplemental Responses and Objections of ISS-GA and ISS-DE to SRI's Interrogatory Nos. 6 & 11, REALSECURE Invalidates the Indicated Claims Under 35 U.S.C.§ 102 (b), pp. 1-21, Nov. 15, 2005.
Exhibit A-21 to the Symantec Corporation's Second Supplemental Responses to SRI International, Inc.'s Interrogatories Nos. 6 and 11,Network Flight Recorder, Network Flight Recorder Invalidates the Indicated Claims Under 35 U.S.C. § 102 (b) and/or 103, pp. 1-53, Nov. 15, 2005.
Exhibit A-22 to the Symantec Corporation's Second Supplemental Responses to SRI International, Inc.'s Interrogatories Nos. 6 and 11, Automated Information System "AIS", AIS Invalidates the Indicated Claims Under 35 U.S.C. § 102 (b), pp. 1-21, Nov. 15, 2005.
Exhibit A-23 to the Symantec Corporation's Second Supplemental Responses to SRI International, Inc.'s Interrogatories Nos. 6 and 11, Comparison of Listed Publications to Claims-at-Issue of SRI's Patent-in-Suit for 35 U.S.C. § 103, pp. 1-57, Nov. 15, 2005.
Supplemental Responses and Objections of ISS-GA and ISS-DE to SRI's Interrogatory Nos. 6 & 11, *SRI International, Inc., a California Corporation v. Internet Security Systems Inc., a Delaware Corporation, Internet Security Systems, Inc., a Georgia Corporation, and Symantec Corporation, a Delaware Corporation*, pp. 1-22, Certificate of Service dated Nov. 15, 2005.
Exhibit 1 to the Supplemental Responses and Objections of ISS-GA and ISS-DE to SRI's Interrogatory Nos. 6 & 11, EMERALD 1997 Invalidates the Indicated Claims Under 35 U.S.C. § 102 (b), pp. 1-60, Nov. 15, 2005.
Exhibit 2 to the Supplemental Responses and Objections of ISS-GA and ISS-DE to SRI's Interrogatory Nos. 6 & 11, CMAD Invalidates the Indicated Claims Under 35 U.S.C. § 102 (b) and/or 103,pp. 1-27, Nov. 15, 2005.
Exhibit 3 to the Supplemental Responses and Objections of ISS-GA and ISS-DE to SRI's Interrogatory Nos. 6 & 11, EMERALD Conceptual Overview Invalidates the Indicated Claims Under 35 U.S.C.§ 102 (b) and/or 103, pp. 1-35, Nov. 15, 2005.
Exhibit 4 to the Supplemental Responses and Objections of ISS-GA and ISS-DE to SRI's Interrogatory Nos. 6 & 11, Conceptual Design and Planning for EMERALD: Event Monitoring Enabling Responses to Anomalous Live Disturbances Version 1.2, May 20, 1997Invalidate the Indicated Claims Under 35 U.S.C.§ 102 (b) and/or 103, pp. 1-58, Nov. 15, 2005.
Exhibit 5 to the Supplemental Responses and Objections of ISS-GA and ISS-DE to SRI's Interrogatory Nos. 6 & 11, Live Traffic Analysis Invalidates the Indicated Claims Under 35 U.S.C.§ 102 (b), pp. 1-52, Nov. 15, 2005.
Exhibit 6 to the Supplemental Responses and Objections of ISS-GA and ISS-DE to SRI's Interrogatory Nos. 6 & 11, Next-Generation Intrusion Detection Expert System (NIDES): A Summary Invalidates the Indicated Claims Under 35 U.S.C.§ 102 (b), pp. 1-47, Nov. 15, 2005.
T. Lunt et al., A Real-time Intrusion Detection Expert System (IDES): Final Technical Report, Technical Report, SRI Computer Science Laboratory, Menlo Park, CA, Feb. 28, 1992.
T.F. Lunt et al., IDES: A Progress Report, Proc. 6th Annual Computer Security Applications Conference, pp. 273-285, 1990.
PC Week, NetRanger Keeps Watch Over Security Leaks, Sep. 1997.
Network Systems Corp., Data Privacy Facility Administrator's Guide Version 1.2, Sep. 1995.
RealSecure 1.2: User Guide and Reference Manual 1997.
3Com, HP Openview for Windows User Guide for Transcend Management Software, Version 6.1 for Windows and '97 for Windows NT, Oct. 1997.
3Com, HP Openview for Windows Workgroup Node Manager User Guide for Transcend Management Software, Version 6.0 for Windows, Jan. 1997.

Y. Frank Jou and S. Felix Wu, Scalable Intrusion Detection for Emerging Network Infrastructures, IDS Program Review Presentation, SRI, Jul. 1997.

Y. Frank Jou et al., Architecture Design of a Scalable Intrusion Detection System For the Emerging Network Infrastructure, Technical Report CDRL A005, DARPA Order E296, Department of Computer Science, North Carolina State University, Apr. 1997.

Shyhtsun F. Wu et al., Intrusion Detection for Link-state Routing Protocols, Dec. 2, 1996.

Diheng Qu et al., Statistical Anomaly Detection for Link-state Routing Protocols, 6th International Conference on Network Protocol (ICNP '98), pp. 62-70, Oct. 1998.

SRI International, Inc.'s Responses to Defendants ISS-GA's Second Set of Interogatories (Nos. 19-20) and SRI's Third Supplemental Response to ISS-GA's Interrogatory No. 17, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-54, Certificate of Service dated Dec. 15, 2005.

SRI International, Inc.'s Response to Symantec's Invalidity and Inequitable Conduct Contentions, *SRI International, inc., a California Corporation v. Internet Security Systems, Inc., a Delaware Corporation, Internet Security Systems, Inc., a Georgia Corporation and Symantec Corporation a Delaware Corporation*, pp. 1-50, Certificate of Service dated Dec. 15, 2005.

SRI International, Inc.'s Supplemental Response to Interrogatories No. 12. and No. 15, *SRI International, Inc., a California Corporation v. Internet Security Systems, Inc. a Delaware Corporation, Internet Security Systems, Inc. a Georgia Corporation and Symantec Corporation a Delaware Corporation*, pp. 1-6, Certificate of Service date Dec. 15, 2005.

SRI International, Inc.'s "Amended" Response to Symantec's Invalidity and Inequitable Conduct Contentions, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-51, Certificate of Service date Dec. 16, 2005.

S.S. Chen et al, GrIDS—A Graph Based Intrusion Detection System for Large Networks, 19th National Information Security Systems Conference, 1996.

L.T. Heberlein, et al., Internetwork Security Monitor, Proc. 15th National Computer Security Conference, Oct. 13-16, 1992, pp. 262-271.

B. Mukherjee et al., Network Intrusion Detection, IEEE Network 8(3), pp. 26-41, May/Jun. 1994.

B. Gleichauf and D. Teal, NetRanger High-level Overview Version 1.1, WheelGroup Corp., Nov. 1996.

S.R. Snapp, et al., A System for Distributed Intrusion Detection, COMPCON Spring'91, Digest of Papers, San Francisco, CA, Feb. 25-Mar. 1, 1991, pp. 170-176.

James Brentano et al., An Architecture for a Distributed Intrusion Detection System, Proc. 14th Department of Energy Computer Security Group Conference, May 7-9, 1991, pp. 17.25-17.45.

L.T. Heberlein et al., Towards Detecting Intrusions in a Networked Environment, Proc. 14th Department of Energy Computer Security Group Conference, pp. 17.47-17.65, May 7-9, 1991.

L.T. Heberlein , Towards Detecting Intrusions in a Networked Environment, Technical Report CSE-91-23, Division of Computer Science, UC Davis, Jun. 1991.

L.T. Heberlein et al., A Method to Detect Intrusive Activity in a Networked Environment, Proc. 14th National Computer Security Conference, pp. 362-371, Oct. 1991.

Ranum et al., Implementing a Generalized Tool for Network Monitoring, Proc. 11$^{th}$ Systems Administration Conference (LISA'97), San Diego, CA, Oct. 1997.

Steven Snapp et al., Intrusion Detection Systems (IDS): A Survey of Existing Systems and a Proposed Distributed IDS Architecture, CSE-91-7, allegedly dated Feb. 1991.

L.T. Heberlein et al., Network Attacks and an Ethernet-based Network Security Monitor, Proc. 13th Department of Energy Computer Security Group Conference, pp. 14.1-14.13, May 8-10, 1990.

RealSecure 1.1: User Guide and Reference Manual, 1997.

Exhibit A-9 to the Symantec Corporation's Second Supplemental Responses to SRI International, Inc.'s Interrogatories Nos. 6 and 11, Distributed Intrusion Detection System, "DIDS Feb. 1991 and DIDS Oct. 1991", Each of DIDS Feb. 1991 and DIDS Oct. 1991 Invalidate the Indicated Claims Under 35 U.S.C. § 102 (b), pp. 1-88, Nov. 15, 2005.

Exhibit A-10 to the Symantec Corporation's Second Supplemental Responses to SRI International, Inc.'s Interrogatories Nos. 6 and 11, Graph Based Intrusion Detection System for Large Networks, "GRIDS 1996 and GRIDS 1997", GRIDS 1996 and GRIDS 1997 Invalidate the Indicated Claims Under 35 U.S.C. § 102 (b), pp. 1-39, Nov. 15, 2005.

Exhibit A-11 to the Symantec Corporation's Second Supplemental Responses to SRI International, Inc.'s Interrogatories Nos. 6 and 11, Wheelgroup Corporation, "Netranger", Each of Netranger User Guide 1.3.1 Invalidate the Indicated Claims Under 35 U.S.C. § 102 (b), pp. 1-34, Nov. 15, 2005.

Exhibit A-12 to the Symantec Corporation's Second Supplemental Responses to SRI International, Inc.'s Interrogatories Nos. 6 and 11, Internet Security Systems, "Realsecure", Realsecure Invalidates the Indicated Claims Under 35 U.S.C. § 102 (b), pp. 1-22, Nov. 15, 2005.

Exhibit A-13 to the Symantec Corporation's Second Supplemental Responses to SRI International, Inc.'s Interrogatories Nos. 6 and 11, The Architecture of a Network Level Intrusion Detection System, "Network Level Intrusion Detection", Network Level Intrusion Detection Invalidates the Indicated Claims Under 35 U.S.C. § 102 (b), pp. 1-20, Nov. 15, 2000.

Exhibit A-14 to the Symantec Corporation's Second Supplemental Responses to SRI International, Inc.'s Interrogatories Nos. 6 and 11, U.S. Patent No. 5,825,750 (Thompson), U.S. Pat. No. 5,825,750 (Thompson) Invalidates the Indicated Claims Under 35 U.S.C. § 102 (a) and 102(e), pp. 1-13, Nov. 15, 2005.

Exhibit A-15 to the Symantec Corporation's Second Supplemental Responses to SRI International, Inc.'s Interrogatories Nos. 6 and 11, Fault Detection in an Ethernet Network Via Anomaly Detectors, Fault Detection in an Ethernet Network Via Anomaly Detectors Invalidates the Indicated Claims Under 35 U.S.C. § 102 (b), pp. 1-9, Nov. 15, 2005.

Exhibit A-16 to the Symantec Corporation's Second Supplemental Responses to SRI International, Inc.'s Interrogatories Nos. 6 and 11, Harris Corporation, "Stake Out Network Surveillance", Stake Out Network Surveillance Invalidates the Indicated Claims Under 35 U.S.C. § 102 (b), pp. 1-12, Nov. 15, 2005.

Exhibit A-17 to the Symantec Corporation's Second Supplemental Responses to SRI International, Inc.'s Interrogatories Nos. 6 and 11, HP Openview for Windows User Guide, "HP Openview", HP Openview and the Internet Standards Invalidate the Indicated Claims Under 35 U.S.C. § 102 (b) and/or 103, pp. 1-29, Nov. 15, 2005.

Exhibit A-18 to the Symantec Corporation's Second Supplemental Responses to SRI International, Inc.'s Interrogatories Nos. 6 and 11, Internetwork Security Monitor, "ISM", ISM and DIDS Invalidate the Indicated Claims Under 35 U.S.C. § 102 (b) or 103, pp. 1-80, Nov. 15, 2005.

Exhibit A-19 to the Symantec Corporation's Second Supplemental Responses to SRI International, Inc.'s Interrogatories Nos. 6 and 11, EMERALD 1997, Intrusive Activity 1991, NIDES 1994, EMERALD 1997, Intrusive Activity 1991, and NIDES 1994 Invalidate the Indicated Claims Under 35 U.S.C. § 102 (b) and/or 103, pp. 1-53, Nov. 15, 2005.

Exhibit A-20 to the Symantec Corporation's Second Supplemental Responses to SRI International, Inc.'s Interrogatories Nos. 6 and 11, Netstalker and HP Openview, Netstalker and HP Openview Invalidate the Indicated Claims Under 35 U.S.C. § 102 (b) and/or 103, pp. 1-32, Nov. 15, 2005.

NFR User Guide, Version 1.1, Nov. 1997.

L. Todd Heberlein, Network Security Monitor Final Report, allegedly dated Feb. 1995.

Steven R. Snapp et al., The DIDS (Distributed Intrusion Detection System) Prototype, Proc. Summer 1992 USENIX Conference, Jun. 8-12, 1992.

RealSecure 1.2.2: User Guide and Reference Manual, Sep. 11, 1997.

NFR Beta Handbook, Nov. 1997.

Harris Corporation Web Site allegedly obtained from archive.org.

Roy Maxion et al., A Case Study of Ethernet Anomalies in a Distributed Computing Environment, IEEE Transactions on Reliability, 39(4), pp. 433-443, Oct. 1990.
NetRanger SQL Queries, allegedly dated May 28, 1997.
Frank Feather et al., Fault Detection in an Ethernet Network Using Anomaly Signature Matching, Computer Communication Review, SIGCOMM'93 Conference Proceedings, pp. 279-288, Sep. 13-17, 1992.
NFR Version 2.0 Library, Oct. 5, 1998.
NFR Version 2.0 Getting Started Guide, undated.
NFR Version 2.0 User's Guide, undated.
NFR Version 2.0 Advanced User's Guide, undated.
NFR Version 2.0 Glossary, undated.
Haystack Labs, NetStalker for Network Systems Corporation, web page, allegedly dated 1996.
Haystack Labs, Network Systems and Haystack Labs introduce NetStalker to Track Hacker Attempts, Press Release, Nov. 10, 1995.
C. Schuba, On the Modeling, Design and Implementation of Firewall Technology, Ph.D. Thesis, Purdue University, Dec. 1997.
Netranger, Installation & Configuration Training, Slide Presentation, Apr. 1997.
WheelGroup Corp., Traditional Security Basics, Undated.
T.F. Lunt et al., A Real-time Intrusion Detection Expert System (IDES): Interim Progress Report Project 6784, SRI International, May 1990.
ISS, RealSecure web page, allegedly dated 1997.
ISS, Built-in Attack Recognition Capabilities Give Organizations Power to Detect and Respond to Attacks Before It's Too Late, Press release, May 12, 1997.
ISS, More About RealSecure: General Description and Comparison to Existing Systems, web page, allegedly available Jul. 21, 1997.
ISS, Frequently Asked Questions about RealSecure, web page, allegedly last updated May 30, 1997, and alleged available Jul. 21, 1997.
ISS,, Frequently Asked Questions about RealSecure, web page, allegedly last updated Oct. 21, 1997, and alleged available Jan. 20, 1998.
ISS, Frequently Asked Questions about RealSecure, web page, alleged available 1998.
ISS, Real-time Attack Recognition and Response: A Solution for Tightening Network Security, allegedly available Jan. 20, 1998.
ISS, Internet Security Systems Launches RealSecure 1.0 for Windows NT, Press release, May 12, 1997.
ISS, Internet Security Systems Augments Network Security with Real-time Attack Recognition and Response Tool, Press release, Dec. 9, 1996.
ISS, Internet Security Systems Ships RealSecure for Windows NT, Industry's First Real-time Attack Recognition and Response Tool for Windows NT, Press release, Aug. 19, 1997.
ISS, ISS Announces New Version of Leading Real-time Security Attack Recognition and Response Tool, Press release, Mar. 25, 1997.
Harris Corporation, Stake Out Network Surveillance, White Paper, 1996.
ISS, RealSecure Release Dates Table, Undated.
NFR, Frequently Asked Questions / Troubleshooting Guide, Undated.
Graph-based Intrusion Detection System (GRIDS) Home Page, webpage allegedly archived Jul. 19, 1997.
GrIDS Requirements Document, webpage allegedly archived Dec. 14, 1996.
GrIDS Outline Design Document, webpage allegedly archived Dec. 14, 1996.
Steven Cheung et al., The Design of GRIDS: A Graph-based Intrusion Detection System, Technical Report, UC Davis Department of Computer Science, May 14, 1997.
Steven Cheung et al., Graph-based Intrusion Detection System, Presentation at PI Meeting, Savannah, GA, Feb. 25-27, 1997.
WheelGroup Corp., NetRanger User's Guide 1.2.2, 1997.
R. Power et al., Detecting Network Intruders, Network Magazine, pp. 137-138, Oct. 1997.
P. Neumann, P. Porras and A. Valdes, Analysis and Response for Intrusion Detection in Large Networks, Summary for CMAD Workshop, Monterey, Nov. 12-14, 1996.
HP SNMP/XL User's Guide, HP 3000 MPE/iX Computer Systems Edition 5, Hewlett-Packard, Apr. 1994.
Haystack Labs, NetStalker, Installation and User's Guide, Version 1.0.2, 1996.
WheelGroup Corporation, NetRanger User Guide Version 1.3.1, 1997.
Shostack, A., An overview of SHTTP, pp. 1-7, May 1995.
Radlan, "Intrusion Detection, Extend the Monitoring and Protection of Your Network", Radlan White Paper, pp. 1-7, Feb. 1999.
ISS, "Introduction to RealSecure Version 3.0", pp. 1-46, 1999.
Network Assoc., "Next Generation Intrusion Detection in High-Speed Networks", pp. 1-18, 1999.
Almgren, et al., "A lightweight Tool for Detecting Web Server Attacks," Network and Distributed Systems Security ( NDSS 2000) Symposium Proceedings, pp. 157-170, 2000 , provided is marked as pp. 1-14.
Almgren, et al., "Application-Integrated Data Collection for Security Monitoring," From Recent Advances in Intrusion Detection (RAID 2001) Springer, Davis, California, pp. 22-36 Oct. 2001 ( provided comprises of pp. 1-21).
Daniels, et al. "A network Audit System for Host-based Intrusion Detection (NASHID) in Linux," $16^{th}$ annual Computer Security Application Conference (ACSAC 00) pp. 1-10, Dec. 2000.
Daniels, et al. "Identification of Host Audit Data to Detect Attacks on Low-Level IP Vulnerabilities," J. Computer Security, 7 (1), pp. 3-35, 1999.
Dayioglu, "APACHE Intrusion Detection Module," http://yunus.hacettepe.edu.tr/~burak/mod id, pp. 1-6, date Unknown, Downloaded Nov. 10, 2003.
Hollander, Y., "The Future of Web Server Security: Why your web site is still vulnerable to attack," http://www.cgisecurity.com/lib/wpfuture.pdf, pp. 1-9, allegedly posted 2000.
Lindqvist, et al, "eXpert-BSM: A host-based Intrusion Detection Solution for Sun Solaris," Proc $17^{th}$ Annual Computer security Application Conference, p. 240-251, Dec. 2001(provided comprises of pp. 1-12).
M. Siegl et al., Hierarchical Network Management—A Concept and its Prototype in SNMPv2, allegedly dated 1996.
RFC 1155, Structure and Identification of Management Information for TCP/IP-based Intranets, May 1990.
RFC 1157, A Simple Network Management Protocol (SNMP), May 1990.
RFC 1213, Management Information Base for Network Management of TCP/IP-based Internets: MIB-II, Mar. 1991.
RFC 1441, Introduction to Version 2 of the Internet-standard Network Management Framework, Apr. 1993.
RFC 1757, Remote Network Monitoring Management Information Base, Feb. 1995.
RFC 1271, Remote Network Monitoring Management Information Base, Nov. 1991.
RFC 1451, Manager-to-Manager Management Information Base, Apr. 1993.
Richard Heady et al., The Architecture of a Network Level Intrusion Detection System, Technical Report CS90-20, University of New Mexico, Department of Computer Science, Aug. 15, 1990.
ISS, RealSecure 1.0: User Guide and Reference Manual, 1996.
Karl Levitt and Christopher Wee (Eds.) Proceedings of Fourth Workshop on Future Directions in Computer Misuse and Anomaly Detection, Monterey, California, Nov. 12-14, 1996.
WheelGroup Corp., NetRanger User's Guide, 1996.
WheelGroup Corp., NetRanger User's Guide 1.2, 1997.
P.Porras and P. Neumann, EMERALD : Event Monitoring Enabling Responses to Anomalous Live Disturbances Conceptual Overview, Dec. 18, 1996.
WheelGroup Corp, WheelGroup Press Release Summary, undated.
WheelGroup Corp., WheelGroup Releases NetRanger 2.0, Press Release, Aug. 25, 1997.
WheelGroup Corp., Summary of DoD/SPOCK Evaluation of WheelGroup's NetRanger Intrusion Detection System, Press Release, Jul. 8, 1997.

* cited by examiner

| | INVALID | PRIVILEGE_VIOLATION | USER_SUBVERSION | DENIAL_OF_SERVICE | PROBE | ACCESS_VIOLATION | INTEGRITY_VIOLATION | SYSTEM_ENV_CORRUPTION | USER_ENV_CORRUPTION | ASSET_DISTRESS | SUSPICIOUS_USAGE | CONNECTION_VIOLATION | BINARY_SUBVERSION | ACTION_LOGGED |
|---|---|---|---|---|---|---|---|---|---|---|---|---|---|---|
| INVALID | 1 | 0.3 | 0.3 | 0.3 | 0.3 | 0.3 | 0.3 | 0.3 | 0.3 | 0.3 | 0.3 | 0.3 | 0.3 | 0.6 |
| PRIVILEGE_VIOLATION | 0.3 | 1 | 0.6 | 0.3 | 0.6 | 0.6 | 0.6 | 0.6 | 0.4 | 0.3 | 0.4 | 0.1 | 0.5 | 0.6 |
| USER_SUBVERSION | 0.3 | 0.6 | 1 | 0.3 | 0.6 | 0.5 | 0.5 | 0.4 | 0.6 | 0.3 | 0.4 | 0.1 | 0.5 | 0.6 |
| DENIAL_OF_SERVICE | 0.3 | 0.3 | 0.3 | 1 | 0.6 | 0.3 | 0.3 | 0.4 | 0.3 | 0.5 | 0.4 | 0.1 | 0.5 | 0.6 |
| PROBE | 0.3 | 0.2 | 0.2 | 0.3 | 1 | 0.7 | 0.3 | 0.3 | 0.3 | 0.3 | 0.4 | 0.8 | 0.3 | 0.6 |
| ACCESS_VIOLATION | 0.3 | 0.6 | 0.3 | 0.5 | 0.6 | 1 | 0.6 | 0.6 | 0.3 | 0.3 | 0.4 | 0.1 | 0.5 | 0.6 |
| INTEGRITY_VIOLATION | 0.3 | 0.5 | 0.3 | 0.5 | 0.6 | 0.8 | 1 | 0.6 | 0.5 | 0.3 | 0.4 | 0.1 | 0.5 | 0.6 |
| SYSTEM_ENV_CORRUPTION | 0.3 | 0.5 | 0.3 | 0.5 | 0.6 | 0.6 | 0.6 | 1 | 0.6 | 0.3 | 0.4 | 0.1 | 0.5 | 0.6 |
| USER_ENV_CORRUPTION | 0.3 | 0.5 | 0.5 | 0.3 | 0.6 | 0.6 | 0.6 | 0.6 | 1 | 0.3 | 0.4 | 0.1 | 0.5 | 0.6 |
| ASSET_DISTRESS | 0.3 | 0.3 | 0.3 | 0.6 | 0.3 | 0.3 | 0.3 | 0.3 | 0.3 | 1 | 0.4 | 0.4 | 0.3 | 0.6 |
| SUSPICIOUS_USAGE | 0.3 | 0.3 | 0.5 | 0.3 | 0.5 | 0.6 | 0.5 | 0.6 | 0.5 | 0.3 | 1 | 0.1 | 0.3 | 0.6 |
| CONNECTION_VIOLATION | 0.3 | 0.1 | 0.1 | 0.3 | 0.8 | 0.3 | 0.3 | 0.3 | 0.3 | 0.5 | 0.4 | 1 | 0.3 | 0.6 |
| BINARY_SUBVERSION | 0.3 | 0.3 | 0.3 | 0.3 | 0.3 | 0.6 | 0.6 | 0.6 | 0.5 | 0.3 | 0.4 | 0.1 | 1 | 0.6 |
| ACTION_LOGGED | 0.3 | 0.3 | 0.3 | 0.3 | 0.6 | 0.5 | 0.3 | 0.3 | 0.3 | 0.3 | 0.4 | 0.3 | 0.3 | 1 |

Figure 5

PROBABILISTIC ALERT CORRELATION

REFERENCE TO RELATED APPLICATION

This is a continuation-in-part of U.S. patent application Ser. No. 09/711,323, filed Nov. 9, 2000 and entitled "Sensor and Alert Correlation in Intrusion Detection Systems," which is a continuation-in-part of U.S. patent application Ser. No. 09/653,066, filed Sep. 1, 2000 and entitled "Methods for Detecting and Diagnosing Abnormalities Using Real-Time Bayes Networks." Both of these patent applications are incorporated herein by reference. This application also claims priority under 35 USC §119(e) from co-pending Provisional patent application No. 60/278,514, filed Mar. 23, 2001, naming Alfonso de Jesus Valdes and Keith M. Skinner as inventors and entitled "Probabilistic Alert Correlation," which is incorporated herein by reference.

REFERENCE TO GOVERNMENT FUNDING

This invention was made with Government support under contract numbers F30602-99-C-0149 and N66001-00-C-8058 awarded by DARPA. The Government has certain rights in this invention.

TECHNICAL FIELD

The invention relates generally to intrusion detection, and more specifically to sensor and alert correlation in intrusion detection systems.

BACKGROUND

There are three main types of intrusion detection systems currently used to detect hacker attacks on computer networks: signature analysis systems, statistical analysis systems, and systems based on probabilistic reasoning. Signature analysis systems compare current data traffic patterns with stored traffic patterns representing the signature or profile of various types of hacker attacks. These systems generate an alert if the pattern of traffic received by the network matches one of the stored attack patterns.

Statistical analysis systems compare current data traffic patterns with statistical profiles of previous traffic patterns. These systems generate an alert if a current traffic pattern is significantly different from a stored profile of "normal" traffic. Examples of both statistical- and signature-based intrusion detection systems are described in Porras, et al., "*Live Traffic Analysis of TCP/IP Gateways*," Internet Society's Networks and Distributed Systems Society Symposium, March 1998.

Examples of intrusion detection systems based on probabilistic reasoning are described in U.S. patent application Ser. No. 09/653,066 entitled "Methods for Detecting and Diagnosing Abnormalities Using Real-Time Bayes Networks." In one such system, a Bayes network is established that includes models (called "hypotheses") that represent both normal traffic and attack traffic received by a computer network. Traffic actually received by the network is examined in real-time to identify its relevant characteristics or features, such as volume of data transfer, number of erroneous connection requests, nature of erroneous connection requests, ports to which connections are attempted, etc. Information about these relevant features is then provided to the Bayes network, which calculates a system belief (a probability) that the current network traffic is either normal traffic or attack traffic.

A typical intrusion detection system may include one or more sensors that monitor network traffic in the manner discussed above, and one or more other sensors that monitor network resources. A system operator or network administrator (usually a person) reviews all of the alerts generated by the system.

A major problem with existing intrusion detection systems is that they often provide misleading, incomplete, or low-quality information to the system operator; this may make it impossible to take proper steps to protect the network. For example, during a large-scale hacker attack each of the system's sensors may generate hundreds of alerts. Although each alert may be accurate, the sheer number of alerts could easily overwhelm the system operator. Moreover, false alarms can be triggered by normal traffic directed towards a malfunctioning network resource, such as a server. These false alarms could distract the system operator from alerts triggered by actual hacker attacks. Finally, most intrusion detection systems are unable to detect low-level attacks such as port sweeps, in which hackers slowly "probe" a network to discover its structure and weaknesses.

SUMMARY

This invention uses probabilistic correlation techniques to increase sensitivity, reduce false alarms, and improve alert report quality in intrusion detection systems. In one preferred embodiment, an intrusion detection system includes at least two sensors to monitor different aspects of a computer network, such as a sensor that monitors network traffic and a sensor that discovers and monitors available network resources. The sensors are correlated in that the belief state of one sensor is used to update or modify the belief state of another sensor. For example, a network resource sensor may detect that a server is malfunctioning. This information is used to modify the belief state of one or more network traffic sensors so that normal network traffic directed towards the malfunctioning server does not trigger a false alarm.

In another example, a network resource sensor transmits its knowledge of network structure to a network traffic sensor. This information is used to modify the belief state of the network traffic sensor so that an attempt to communicate with a non-existent resource appears to be suspicious. By allowing different sensors to share information, the system's sensitivity to low-level attacks can be greatly increased, while at the same time greatly reducing the number of false alarms.

In another embodiment, probabilistic correlation techniques are used to organize alerts generated by different types of sensors. By comparing features of each new alert with features of previous alerts, rejecting a match if a feature fails to meet a minimum similarity value, and adjusting the comparison by an expectation that certain feature values will or will not match, the alerts can be grouped in an intelligent manner. The system operator may then be presented with a few groups of related alerts, rather than lots of individual alerts from multiple sensors.

Other features, objects, and advantages of the invention will be apparent from the description and drawings, and from the claims.

DESCRIPTION OF DRAWINGS

FIG. 5 is an example of an incident class similarity matrix as used in one embodiment.

Like reference symbols in the various drawings indicate like elements.

DETAILED DESCRIPTION

I. Introduction

In preferred embodiments, intrusion detection systems for computer networks include sensors that monitor both network traffic and network resources. Correlation techniques are used to increase system sensitivity, reduce false alarms, and organize alerts into related groups. The sensor and alert correlation techniques described below may be used in intrusion detection systems that include any type or mix of sensors. However, probabilistic sensors similar to those described in U.S. patent application Ser. No. 09/653,066 may provide advantages over other types of sensors.

Bayes networks are preferably used to perform the probabilistic reasoning functions described below. As is more fully described in U.S. patent application Ser. No. 09/653,066, Bayes networks include models (called "hypotheses") that represent some condition or state; probabilistic reasoning methods are used to determine a belief that a current observation corresponds to one of the stored hypotheses. Before a Bayes network performs an analysis, an initial belief (called a "prior probability") regarding the various hypotheses is established. During the analysis, a new belief based on actual observations is established, and the prior probability is adjusted accordingly. In the context of the embodiments described here, a relevant Bayes hypothesis might be "there is a stealthy portsweep attack against the computer network." Belief in the portsweep attack hypothesis would be strengthened if attempts to connect to several invalid or nonexistent ports are observed.

II. Intrusion Detection with Correlated Sensors

As was discussed above, intrusion detection systems typically have several independent sensors that gather different types of information. In preferred embodiments of this invention, the information gathered by the various sensors may be shared to improve overall performance of the intrusion detection system.

Figure 1:
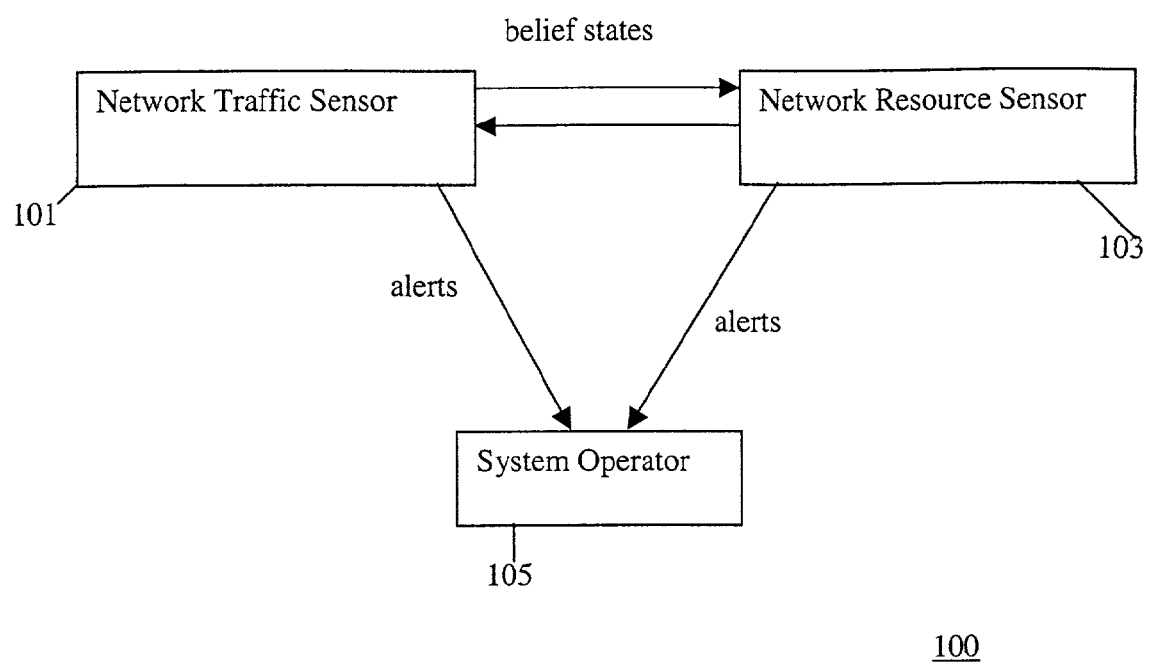
FIG. 1 shows a preferred intrusion detection system with coupled sensors.

In a preferred intrusion detection system 100 shown in FIG. 1, sensors are coupled so that the belief state of one sensor (such as network resource sensor 103) affects the belief state of another sensor (such as network traffic sensor 101). Each sensor may then transmit alerts to a system operator or network administrator 105. These sensors need not be probabilistic sensors; for example, a sensor that keeps track of the number of servers in a network wouldn't need to generate a probabilistic output.

Figure 2:
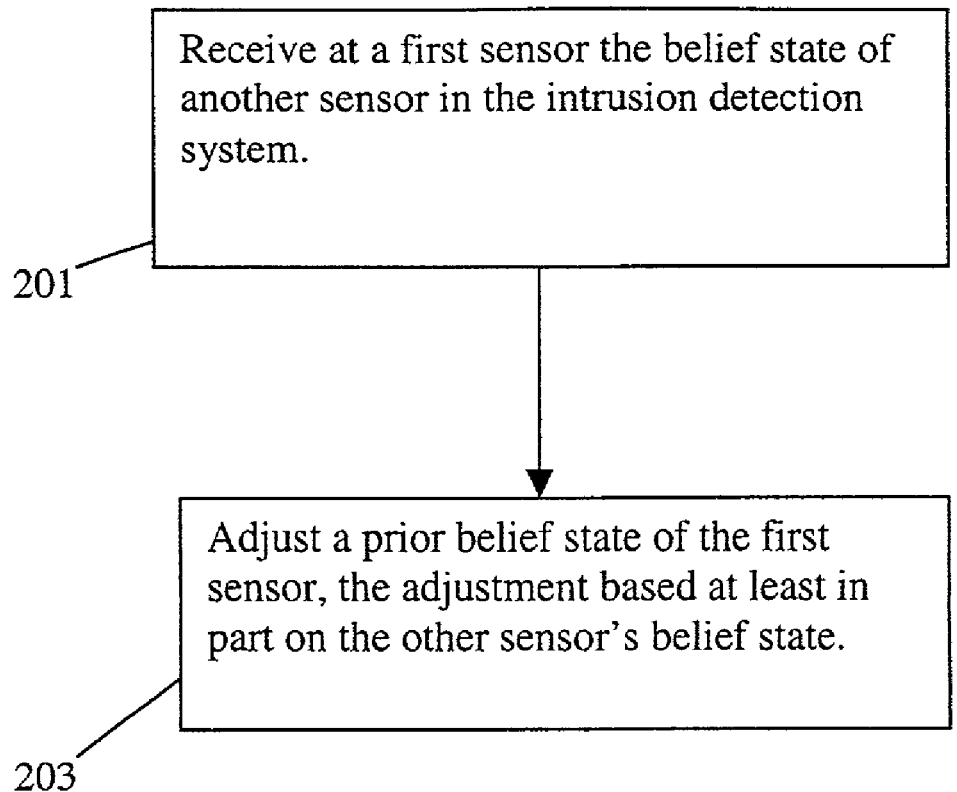
FIG. 2 is a flowchart showing a preferred method for coupling sensors.

FIG. 2 illustrates a preferred method by which sensors are coupled or correlated. At step 201, a first (preferably probabilistic) sensor receives all or part of the belief state of a second (not necessarily probabilistic) sensor. The belief state of the second sensor may indicate an apparent normal, degraded, or compromised state of a monitored system resource, the existence or validity of supported services, or any other relevant belief state held by a sensor in an intrusion detection system. At step 203, a prior belief state of the first sensor is adjusted, the adjustment based at least in part on the second sensor's belief state. For example, the prior belief state of the first sensor or may be adjusted so that an erroneous transaction with a damaged or compromised network resource does not generate an alert. In another example, the prior belief state of the first sensor may be adjusted so that an attempted communication with a system server or resource that does not exist appears to be suspicious. By allowing different sensors to share information, the system's sensitivity to low-level attacks can be greatly increased, while at the same time greatly reducing the number of false alarms.

III. Alert Correlation

In another embodiment, probabilistic correlation techniques are used to organize alerts into classes or groups of related alerts. By comparing features of each new alert with features of previous alerts, and adjusting the comparison by an expectation that certain feature values will or will not match, the alerts can be grouped in an intelligent manner. Alerts may be grouped or organized in several different ways, depending on both the type of an attack and the structures of the intrusion detection system and the monitored network. For example, all alerts related to a specific attack (such as a denial of service attack) may be grouped together. Or, all alerts related to the various stages of a staged attack may be grouped together to allow the system operator to view the progression of a staged attack.

A. Alert Correlation Devices

Figure 3:
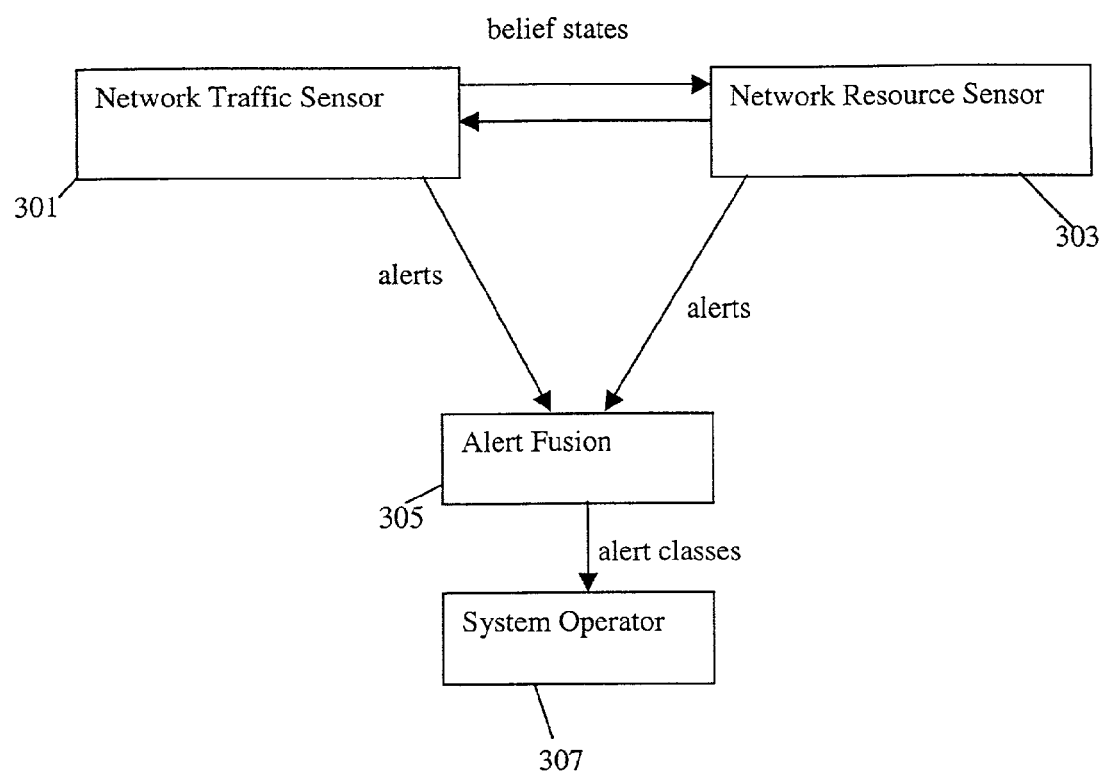
FIG. 3 shows a preferred intrusion detection system with coupled sensors and an alert correlation device.

FIG. 3 shows a preferred intrusion detection system 300 that includes a network traffic sensor 301 and network resource sensor 303. Intrusion detection system 300 may include any number of sensors, and the belief states of the sensors may be correlated in the manner discussed above. Alerts generated by sensors 301 and 303 are provided to an alert correlation device 305, which uses probabilistic reasoning (preferably Baysian) techniques to organize alerts into classes of related alerts. These alert classes are then provided to a system operator or network administrator 307.

B. Measurement of Similarity

To group alerts in an intelligent manner, it is necessary to define and determine the degree of similarity between a new alert and an existing alert or alert class. This measurement of similarity is preferably calculated by comparing similarity among shared features (also called "measures") of the alert and alert class. Examples of features to consider when assessing similarity between a new alert and an existing alert class include source IP address, destination IP address and port, type of alert, type of attack, etc. The nature of an alert may change the expectation of which features should be similar. It is therefore important to define a measurement of similarity to take into account which features are candidates for matching.

In the following discussion, X is defined to be the value of a feature or measure in a new alert, and Y is the value of that feature or measure in an existing alert class to which it is being compared. For features that have a single value, the features of a new alert and an existing alert class are defined to be similar if their feature values are equal. That is:

$$SIM(X, Y) = \begin{cases} 1.0, & X = Y \\ 0, & \text{otherwise} \end{cases}$$

The more general case is one in which a feature of an alert includes a list of observed values, and a "hit count" of the number of times each value has been observed. For reasons of normalization, the hit count may be converted to a probability. In this sense, X and Y are lists of feature and probability values, possibly of different lengths. A probability vector describes a pattern over observed categories, where:

$p_X(C)$=probability of category C in list X,
$p_Y(C)$=probability of category C in list Y,
$P_X$=probability vector over categories observed for X,
$P_Y$=probability vector over categories observed for Y.

The notation $C \in X$ is used to denote that category C occurs in list X. The similarity of the two lists is given by:

$$Sim(X, Y) = \frac{\left[\sum_{C \in X \text{ AND } C \in Y} P_X(C) \times P_Y(C)\right]^2}{(P_X \cdot P_X)(P_Y \cdot P_Y)}$$

If the two lists are the same length, then this measure gives the square of the cosine between the two. This has an intuitive geometric property that is not shared by, say, the dot product as is commonly used in the pattern matching literature.

If the patterns (1, 0), (0, 1), and (0.5, 0.5) are over the same two features, then:

Sim({1,0},{0,1})=0
Sim({0.5,0.5},{0,1})=Sim({0.5,0.5},{1,0})=0.5

In other words, the first two patterns are orthogonal, and the third is halfway in between.

C. Expectation of Similarity

As was discussed above, the nature of an alert may change an expectation of which features of a new alert and an existing alert class should be similar. For example, a syn flood is a type of attack in which the source IP address is typically forged. In this case, similarity in the source IP address would not be considered when assessing the overall similarity between a new alert triggered by a syn flood attack and an existing alert class.

In a preferred embodiment, the expectation of similarity is a feature-specific number between 0 and 1, with 1 indicating a strong expectation of a match, and 0 indicating that two otherwise similar alerts are likely not similar with respect to a specific feature.

An alert state is preferably represented as a probability vector over likely alert states. For each candidate alert state, each feature has a vector of the same length whose elements are the similarity expectation values (that is, numbers between 0 and 1) given the state. These expectation values may initially be assigned a value of about 0.6 to indicate a medium expectation of similarity, except where it is known that the expectation of similarity is either lower or higher. For example, in an access from a compromised host or a denial of service (DOS) attack, the attacker often spoofs (makes up) the source IP address. Therefore, the expectation values may initially be assigned a value of about 0.1, indicating a low expectation that the source IP address will match that of the attacker.

Based on the alert state, the similarity expectation may be dynamically generated as the weighted sum of the elements of an expectation table, with the weights from the (evolving) alert state distribution. This is itself an expectation in the statistical sense, conditioned on the belief over the present alert state. The similarity expectation is therefore general enough to cover the situation of an unambiguous alert or "call" from a signature-based sensor, in which case the distribution over states is 1.0 at the state corresponding to the alert or call and 0 elsewhere. For example, algebraically for a feature or measure J:

$E_J = \Sigma BEL(i)E_J(i)$
$i \in \{\text{alert\_states}\}$ $E_J$=Expected similarity for measure J, given present state.
$BEL(i)$=Belief that the attack state is presently i.
$E_J(i)$=Element i of the lookup table of expected similarity for measure J given state i.

Both the new alert and the alert class to which it is being compared each compute the similarity expectation for each feature. Feature similarity and similarity expectation are then combined to form a single value of alert similarity. This is done by combining feature similarities and normalizing by similarity expectation, over the set of common features. For example:

$$SIM(X, Y) = \frac{\sum_j E_j SIM(X_j, Y_j)}{\sum_j E_j}$$

X=Candidate meta alert for matching
Y=New alert
j=Index over the alert features
$E_j$=Expectation of similarity for feature j
$X_j, Y_j$=Values for feature j in alerts X and Y, respectively (may be list valued)

A similar definition can be formed by taking products rather than sums above, and then taking the geometric mean. This has some advantages, but can be overly influenced by a single extremely small value.

Where appropriate, similarity expectation may also cover list containment and subnet similarity. For example, an intrusion detection system may generate two alerts, one from a network sensor and one from a host sensor. To decide if the target addresses of these two alerts are similar, the expectation of similarity might be that the target address in the alert generated by the host sensor would be contained in the list of target addresses in the network sensor's alert. In another example, an intermediate expectation of similarity may be generated if target addresses from two alerts do not match but appear to be from the same subnet.

D. Minimum Similarity Requirements

It may be possible to eliminate many of the similarity calculations discussed above if one or more features of an alert class are assigned a minimum similarity value. That is, if a feature of a new alert and the corresponding feature of an existing alert class do not match at some minimum similarity value, the new alert cannot be a member of that alert class. There is therefore no need to perform any additional similarity calculations comparing the new alert to that alert class. Certain features can be required to match exactly or approximately for a new alert to be considered as a candidate for an alert class.

E. Transition Models

When a new alert is encountered, all existing alert classes are preferably passed through their transition models to generate new prior belief states. Transition models attempt to assign a "time value" to alert confidence, as well as try to anticipate the next step in a staged attack. The "time value" is typically modeled as a multiplicative decay factor that reduces alert model confidence slowly over a period of days. The decay period varies by type of attack, and eventually decreases to some background level. This is used to down-weight very old alert classes when there are multiple candidates to be compared with a new alert. Transition in time tends to decrease overall suspicion for a specific alert class, as well as spread suspicion over other hypotheses. That is, it tends to make the decision whether to group a new alert with an existing alert class less confident.

The ability to anticipate the next stage in a staged attack is also achieved by a transition in state. Internally, a transition matrix is maintained that expresses the probability of the next state in a staged attack, given the present state. Persistence (the fact that the next step may match the current) is explicitly captured. The transition gives a prior distribution over attack states that is assumed to hold immediately before the next alert is analyzed.

After the transition models generate new prior belief states for their respective alert classes, the similarity expectation for each feature in a new alert is updated. The similarity of the new alert to all existing alert classes is then computed. If none match above some similarity threshold, the new alert is defined to be a new alert class. Otherwise, it is assumed that the new alert is a continuation of the best-matching alert class. By including a list of contributing alerts in the alert class structure, full details of the new alert are retained.

F. Alert Correlation Method

Figure 4:
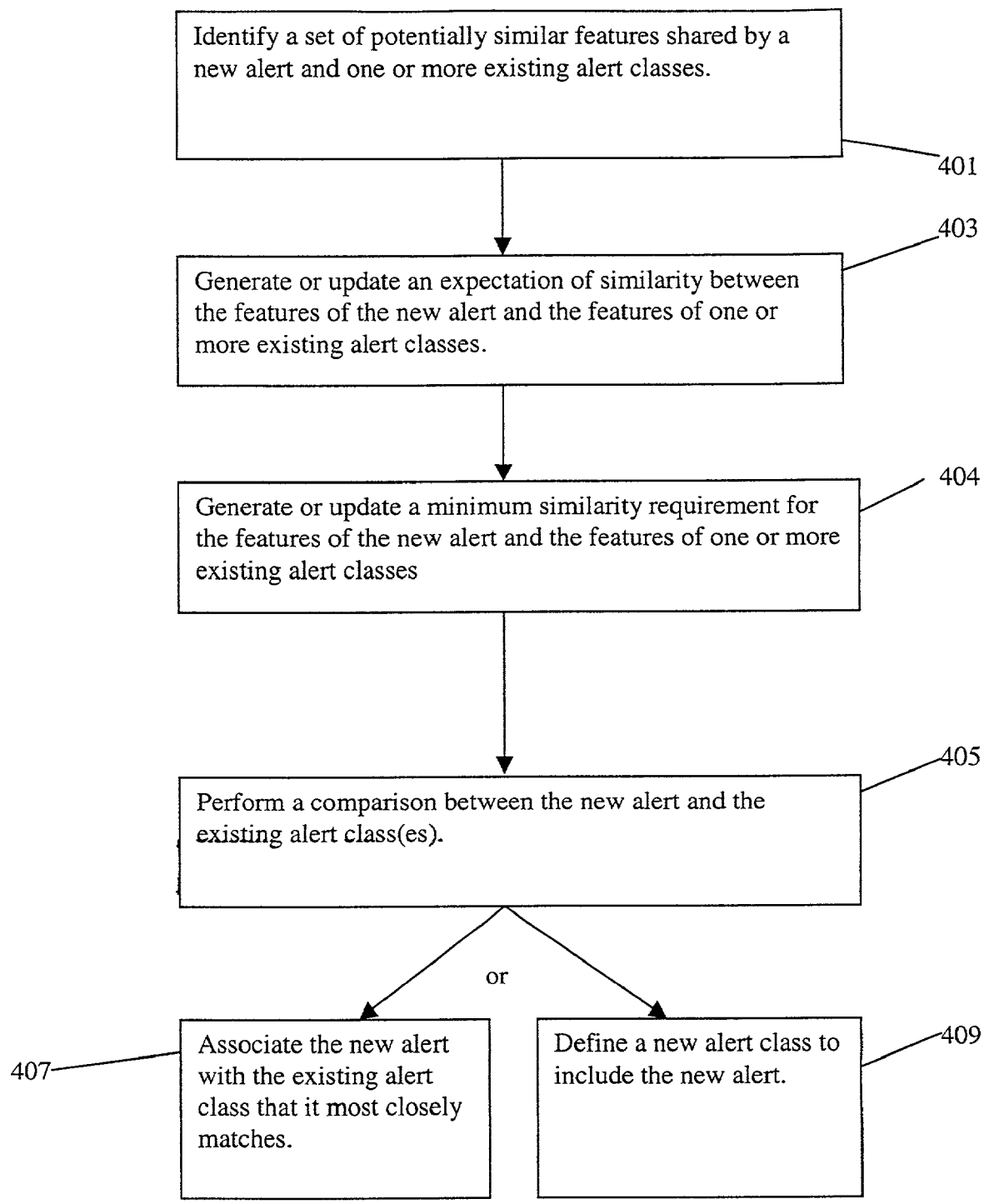
FIG. 4 is a flowchart showing a preferred method for grouping alerts into classes of related alerts.

FIG. 4 is a flowchart showing how alerts may be aggregated into classes of related alerts in a preferred embodiment. As was discussed above, both alerts and alert classes each have one or more distinguishing features that can be assigned different values. First, a set of potentially similar features shared by a new alert and one or more existing alert classes is identified (step 401). Next, an expectation of similarity between the features of the new alert and features of one or more existing alert classes is either generated or updated (step 403). Next, minimum similarity requirements for the features of the new alert and the features of one or more existing alert classes are generated or updated (step 404). After a comparison between the new alert and the existing alert class(es) is complete (step 405), the new alert is either associated with the existing alert class that it most closely matches (step 407), or new alert class is defined to include the new alert (step 409).

IV. Alternative Embodiments and Experimental Results

The inventors plan to present various alternative embodiments and experimental results during a conference in late 2001. Relevant portions of a paper submitted for publication during that conference are shown below.

Introduction

In response to attacks and potential attacks against enterprise networks, administrators are increasingly deploying intrusion detection systems (IDSs). These systems monitor hosts, networks, critical files, and so forth, using a variety of signature and probabilistic techniques. See, Porras, P. and Neumann, P. "EMERALD: Event Monitoring Enabling Responses to Anomalous Live Disturbances," National Information Security Conference, 1997; and Valdes, A. and Skinner, S. "Adaptive, Model-based Monitoring for Cyber Attack Detection", Recent Advances in Intrusion Detection (RAID 2000), Toulouse, France, October 2000. The use of such systems has given rise to another difficulty, namely, correlating a potentially large number of alerts from heterogeneous sensors. To the degree that this has been addressed in current systems, heuristic techniques have been used. In this paper, we describe a probabilistic approach to this critical problem.

The intrusion detection community is actively developing standards for the content of alert messages. See, Erlinger, M. and Stanniford, S. "Intrusion Detection Interchange Fonnat," published by the Internet Engineering Task Force. Systems adhering to these evolving standards forward attack descriptions and supporting diagnostic data to an alert management interface (AMI), which may be remotely located and consolidating the reports of numerous sensors. In anticipation of these standards, we are developing systems for alert correlation and ranking.

In Valdes, A. and Skinner, S. "Blue Sensors, Sensor Correlation, and Alert Fusion," Recent Advances in Intrusion Detection (RAID 2000), Toulouse, France, October 2000, sensor coupling and an initial approach to probabilistic sensor correlation were introduced. At the time, we demonstrated the utility of the coupled sensors approach for false alarm reduction and improved detection performance. We also introduced a correlation approach based on feature-specific similarity functions. The correlation example cited at that time consisted of a single sensor examining a probe that was distributed in time. Since then, we have introduced some important innovations:

Capability to comprehend heterogeneous sensors.

Introduction of the probabilistic minimum match criterion, which prevents spurious matches on less important features from causing the system to correlate alerts. By specifying minimum match of unity, this capability causes the system to function as a rule-based correlation system. Explicitly tolerating slightly imperfect matches provides an important generalization of rule-based correlation methods.

Hierarchy of sensor correlation: thread, incident, and correlated reports from multistep attack scenarios.

We have also gained considerable experimental experience in both live and simulated environments.

The remainder of this paper is organized as follows. We introduce our approach to alert fusion, using our defined alert template to report alerts from EMERALD and third-party sensors. We introduce notions of feature overlap, similarity, expectation of similarity, and minimum similarity. We show how these are used to achieve a hierarchy of alert correlation defined as inferred thread (within sensor), security incident (between sensor) and correlated attack report (between sensor and attack step). We then present preliminary results from the alerts generated by various EMERALD and third-party monitors.

Sensor Correlation and Alert Fusion

In Valdes, A. and Skinner, S. "Blue Sensors, Sensor Correlation, and Alert Fusion", Recent Advances in Intrusion Detection (RAID 2000), Toulouse, France, October 2000, probabilistic methods for sensor correlation were introduced. Specifically, we considered two closely coupled sensors, a TCP misuse monitor and an asset availability monitor. Both are based on Bayes inference (see, Pearl, J. "Probabilistic Reasoning in Intelligent Systems", Morgan-Kaufmann (1988)), and the former sensor is aware of the state of the latter. Sensor coupling in this fashion is easily expressed in Bayes formalisms; specifically, the coupling is achieved by dynamically modifying priors in the TCP session monitor. The approach demonstrated two important capabilities:

Failed accesses to services that appear to be invalid are viewed with greater suspicion than other failed accesses. This greatly increases sensitivity against certain stealth probe attacks.

Certain types of failed access to services that appear "down" are tolerated, so that when a service fails (for malicious or accidental reasons) we do not generate a large number of false alarms.

Having demonstrated the utility of sensor fusion for improved sensitivity and false alarm reduction, we have further explored the general problem of sensor correlation. In particular, we examine the situation of multiple heterogeneous sensors on diverse platforms, considering realistic problems of late reports and clock drift.

Our correlation algorithm considers features as reported in a standard alert template. For each matchable feature, we have defined an appropriate similarity function that returns a value between 0 and 1. New alerts are compared to a list of existing meta alerts. The overall similarity is the weighted average of the feature similarities, with expectation of similarity as the normalizing weights. If the minimum match criterion fails for any feature, the match is rejected regardless of the overall similarity. The new alert is correlated with the most similar meta alert, assuming the similarity is above a specified minimum match threshold. Otherwise, the new alert starts a new meta alert thread.

Meta Alerts and the Alert Template

We have defined an enhanced alert template that enriches standards (such as the Intrusion Detection Interchange Format published by the IETF) with respect to content while avoiding issues of language specifics. Our template includes the concept of alert thread, which is present in all EMERALD monitors and alert management components. Alert reports are part of the same thread if they are from the same sensor and refer to the same attack, possibly separated in time. Where provided, such as is the case with EMERALD monitors, the thread mechanism causes new reports for an existing thread to be treated as updates, dramatically reducing clutter on a display interface that comprehends threads. For this reason, we identified the capability to reliably infer thread when the sensor does not provide one as a very desirable capability of alert correlation.

We include an "anomaly" field in addition to the "confidence" field used in the evolving IETF standard. We also include arrays to describe in greater detail the target(s) of an attack (for example, the specific ports scanned). Finally, we include fields describing the sensor type and placement, enabling us to identify each unique instantiation of any sensor in the monitored domain.

This template is presently used by a diversity of sensors employing both signature and probabilistic techniques. This includes sensors that we have developed under the EMERALD program, as well as prototype wrappers for ISS RealSecure and Checkpoint Firewall-1. Our early experiments indicate that diverse sensors will be able to fill this template with content that will be more useful to correlation engines than is currently available.

Feature Similarity

Our probabilistic alert fusion approach preferably considers feature overlap, feature similarity, minimum similarity, and expectation of similarity. We maintain a list of "meta alerts" that are possibly composed of several alerts, potentially from heterogeneous sensors. For two alerts (typically a new alert and a meta alert), we begin by identifying features they have in common (feature overlap). Such features include the source of the attack, the target (hosts and ports), the class of the attack, and time information. With each feature, we have a similarity function that returns a number between 0 and 1, with 1 corresponding to a perfect match. Similarity is a feature-specific function that considers such issues as How well do two lists overlap (for example, list of targeted ports)?
Is one observed value contained in the other (for example, is the target port of a denial-of-service (DOS) attack one of the ports that was the target of a recent probe)?
If two source addresses are different, are they likely to be from the same subnet?

For attack class similarity, we maintain a matrix of similarity between attack classes, with values of unity along the diagonal and off-diagonal values that heuristically express similarity between the corresponding attack classes. We prefer to consider attack classes rather than attack signatures, which are much more specific and numerous but may be erroneously or incompletely reported. For example, in our demonstration environment, we run a variant of mscan that probes certain sensitive ports, that is, it is of the attack class "portsweep." Our host sensors have a specific signature for this attack and call it "mscan." The Bayes sensor trades specificity for generalization capability and has no "mscan" model, but successfully detects this attack as a "portsweep". These reports are considered similar (S=1) with respect to attack class.

Not all sensors produce all possible identifying features. For example, a host sensor provides process ID, while a network sensor does not. Features not common to both alerts are not considered for the overall similarity match.

The meta alert itself supports the threading concept, so we can visualize composing meta alerts from meta alerts.

Situation-Specific Similarity Expectation

An important innovation we introduce is expectation of similarity. As with similarity, this is also between 0 and 1, and expresses our prior expectations that the feature should match if the two alerts are related, considering the specifics of each. For example, two probes from the same target might scan the same set of ports on different parts of our subnet (so expectation of matching target IP address is low). Also, some attacks such as SYN FLOOD spoof the source address, so we would allow a match with an earlier probe of the same target even if the source does not match (expectation of match for source IP is low).

We now give some examples of how expectation of similarity depends on the situation, that is, the features in the meta alert and the new alert.

If an alert from a sensor has a thread identifier that matches the list of sensor/thread identifiers for some meta alert, the alert is considered a match and fusion is done immediately. In other words, the individual sensor's determination that an alert is an update of or otherwise related to one of its own alerts overrides other considerations of alert similarity.

If the meta alert has received reports from host sensors on different hosts, we do not expect the target host feature to match. If at least one report from a network sensor has contributed to the meta alert and a host sensor alert is received, the expectation of similarity is that the target address of the latter is contained in the target list of the former.

In determining whether an exploit can be plausibly considered the next stage of an attack for which a probe was observed, we expect the target of the exploit (the features host and port) to be contained in the target host and port list of the meta alert.

Some sensors, particularly those that maintain a degree of state, report start and end times for an attack, while others can only timestamp a given alert. The former deal with time intervals, while the latter do not. Similarity in time comprehends overlap of the time intervals in the alerts considered for correlation, as well as the notion of precedence. We preferably do not penalize time similarity too far from unity if the time difference is plausibly due to clock drift.

Deciding whether the attacker is similar is somewhat more involved. In the case of an exact match of originating IP address, similarity is perfect. We assign high similarity if the subnet appears to match. In this way, a meta alert may potentially contain a list of attacker addresses. At this point, we consider similarity based on containment. In addition, if an attacker compromises a host within our network, that host is added to the list of attacker hosts for the meta alert in question.

Finally, for attack classes where the attacker's address is likely to be spoofed (for example, the Neptune attack), similarity expectation with respect to attacker address is assigned a low value.

Minimum Similarity

Our correlation component implements not just expectation of similarity (which effectively acts as a weight vector on the features used for similarity matching) but may also enforce situation-specific minimum similarity. Certain features can be required to match exactly (minimum similarity for these is unity) or approximately (minimum similarity is less than unity, but strictly positive) for an alert to be considered as a candidate for fusion with another. Minimum expectation thus expresses necessary but not sufficient conditions for correlation.

The overall similarity between two alerts is zero if any overlapping feature matches at a value less than the minimum similarity for the feature (features for which no minimum similarity is specified are treated as having a minimum similarity of 0). Otherwise, overall similarity is preferably calculated as the weighted average of the similarities of the overlapping features, using the respective expectations of similarity as weights.

By appropriate settings of similarity expectation and minimum similarity, the correlation component achieves the following hierarchy of correlation. The system is composable in that we can deploy multiple instances to obtain correlation at different stages in the hierarchy. For example, we can infer threads (within sensor correlation) and then correlate threaded alerts from heterogeneous sensors into security incidents.

Synthetic Threads: For sensors that do not employ the thread concept, the correlation may synthesize threads by enforcing high minimum expectation similarity on the sensor itself (the thread must come from a single sensor) and the attack class, as well as source and target (IP and ports). We have wrapped the alert messages from a leading commercial sensor and observed that this facility reliably reconstructs threads.

In particular, by placing an aggregator component topologically close to an IDS, the pair is made robust against attacks that cause the IDS itself to flood, as described in the recent National Infrastructure Protection Center advisory 01-004.

Security Incidents: By suppressing minimum expectation of similarity on the sensor identifier, and relaxing expectation of similarity for this feature, we can fuse reports of the same incident from several heterogeneous sensors into a single incident report. In this case, we enforce a moderately high expectation of similarity on the attack class. This is not unity because different sensors may report a different attack class for the same attack. We construct a table of distances between attack classes that expresses which ones are acceptably close. For security incident correlation, we enforce minimum expectations on the source and target of the attack. Using this technique, we have been able to fuse alert reports from commercial and EMERALD sensors into security incident reports.

Correlated Attack Reports: By relaxing the minimum expectation of similarity on the attack class, we are able to reconstruct various steps in a multistage attack. Each stage in an attack may itself be a correlated security incident as described above. In this fashion, it is possible to recognize a staged attack composed of, for example, a probe followed by an exploit to gain access to an internal machine, and then using that machine to launch an attack against a more critical asset.

Feature Fusion

When the system decides to fuse two alerts, based on aggregate similarity across common features, the fused feature set is a superset of the features of the two alerts. Feature values in fused alerts are typically lists, so alert fusion involves list merging. For example, suppose a probe of certain ports on some range of the protected network matches in terms of the port list with an existing probe that originated from the same attacker subnet, but the target hosts in the prior alert were to a different range of our network. The attacker address list has the new attacker address appended, and the lists of target hosts are merged. The port list matches and is thus unchanged.

Two important features are the sensor and thread identifiers of all the component alerts, so that the operator is always able to examine in detail the alerts that contribute to the meta alert report.

One additional feature is the priority of the meta alert, supported by our template and provided by EMERALD sensors. We are developing a component that estimates criticality based on the assets affected, the type of attack, the likelihood of attack success, and an administrative preference. The aggregator maintains the high water mark for this field. We are investigating approaches whereby the contributing threads are permitted to update their priority downward, computing meta alert priority as the maximum across thread priorities at any given time. This approach would permit downward revision of the meta alert priority.

The features presently considered in the probabilistic correlator component include sensor identification (identifier, location, name), alert thread, incident class, source and target IP lists, target TCP/UDP port lists, source user id, target user id, and time. Computations are only over features that overlap in the alert to be merged and the candidate meta alert into which it is to be merged. Incident signature is used as well, but with a low expectation of similarity as these vary widely across heterogeneous sensors.

If present, a thread identifier from the reporting sensor overrides other match criteria. A new alert that matches the sensor and thread of an existing meta alert is considered an update of the earlier alert.

The correlator first tries to infer a thread by looking for an exact match in sensor identification and incident class and signature. Note that alerts that are inferred to be from the same thread may be separated in time. The system attempts to infer threads even in incident and scenario operational modes.

Next the system checks that all overlapping features match at least at their minimum similarity value. Setting minimum expectation for some features to unity (not normally recommended) causes the system to behave like a heuristic system that requires exact matches on these features. Given that this criterion passes, we compute the overall similarity between the two alerts as follows:

$$SIM(X, Y) = \frac{\sum_j E_j SIM(X_j, Y_j)}{\sum_j E_j}$$

X=Candidate meta alert for matching
Y=New alert
j=Index over the alert features
$E_j$=Expectation of similarity for feature j
$X_j, Y_j$=Values for feature j in alerts X and Y, respectively (may be list valued)

FIG. 5 is an example of an incident class similarity matrix. Incident class similarity is based on a notion of proximity, which at present is the result of our judgment. The proximity of class A to B reflects how reasonably an attack currently of incident class A may progress to class B. Note that this is not symmetric; we more strongly expect an exploit to follow a probe than the other way around. The incident classes shown in FIG. 5 are from the EMERALD 602 message format, but any useful incident classes may be used. Note that some "default" classes such as "invalid" and "action logged" are reasonably proximal to most other classes. This is because the IETF standard does not require a common ontology, and reports from heterogeneous sensors for the same incident may not reliably represent this field. As such, we do not want to reject potential matches based on this field alone. For operational modes other than thread level aggregation, we do not recommend a high minimum similarity value for this field.

For two alerts that are extremely close in time, it is possible that the alerts may not be in time order. In this case, incident class similarity is the greater of SIM(X, Y) and SIM(Y, X). Mathematically, the similarity computation for incident class can comprehend a discrete call (the alert is from one of the above classes) or a call that is a probability distribution over the above classes (as might result from a meta alert in which the contributing sensors do not agree on the class).

Most other features are potentially list-valued. For lists, the notion of similarity generally expresses the fraction of the smaller list that is contained in the larger. For source IP addresses, similarity also attempts to express the notion that the addresses in question may come from the same subnet.

Time similarity is preferably a step function that drops to 0.5 after one hour. A close match in time is expected only when the system operates in "incident" mode. Thread and scenario aggregation may be over time intervals of days.

RESULTS

Live Data

The following is an example of alert correlation over time, in this case correlating alerts that are components of a stealthy port sweep. The following is an example of one of the contributing alerts. In the interest of space, we do not include all the content that is in the alert and meta alert templates, but limit ourselves to the fields needed to illustrate the result.

Thread ID 69156 Class=portsweep BEL (class)=0.994 BEL(attack)=1.000
2001-06-15 17:34:35 from 63.239.148.33 ports 1064 to 1066 duration=0.000
dest IP aaa.bbb.30.117
3 dest ports: 12345{2} 27374{3} 139

This is a probe for three vulnerable ports on a single IP address in the protected network, and is detected by the system described in Valdes, A. and Skinner, S. "Adaptive, Model-based Monitoring for Cyber Attack Detection," Recent Advances in Intrusion Detection (RAID 2000), Toulouse, France, October 2000. The above is just a single step in a probe that apparently transpired over several days, and resulted in the following correlated meta alert.

Meta Alert Thread 248
Source IPs source_IParray: 63.239.148.33 63.239.148.47
Target IPs target_IParray: aaa.bbb.30.117 aaa.bbb.6.232 aaa.bbb.8.31 aaa.bbb.1.166 aaa.bbb.7.118 aaa.bbb.28.83 aaa.bbb.19.121 aaa.bbb.21.130 aaa.bbb.6.194 aaa.bbb.1.114 aaa.bbb.16.150
From 2001-06-15 17:34:35 to 2001-06-21 09:19:57 correlated_alert_priority −1
Ports target_TCP_portarray: 12345{4} 27374{4} 139{3}
Number of threads 10 Threads: 69156 71090 76696 84793 86412 87214 119525 124933 125331 126201
Fused: PORT_SCAN We note that we have correlated events from two source addresses that were judged to be sufficiently similar. The attack is quite stealthy, consisting of a small number of attempted connections to single target hosts over a period of days. The list of thread identifiers permits the administrator to examine any of the stages in the attack. In this case, each attack stage is considered a portsweep; if the stages consisted of different attack classes, these would be listed under "Attack steps". Over the three week time period containing this attack, the IDS sensor processed over 200,000 sessions and generated 4439 alerts. The probabilistic correlation system produced 604 meta alerts.

Experimentation Environment

The experimentation environment simulates an electronic commerce site, and provides Web and mail services over the Internet. The protected network is behind a firewall, and is instrumented with several host, network, and protocol monitors. Two machines are visible through the firewall, and two auxiliary machines are used for network monitors and alert management. The firewall blocks all services other than Web, FTP, and mail. We have simulated traffic that appears to come from a number of sources, and an attacker who executes certain well-known attacks. The background traffic includes legitimate anonymous and nonanonymous FTP use; the latter triggers false alarms in some signature sensors. There are also low-priority nuisance attacks, as well as low-level failed accesses to blocked ports, which trigger firewall log messages.

The attack begins with an MSCAN probe to the two machines visible through the firewall. Signature-based sensors on the two machines detect this and set the attack code for mscan in their alert report. The Bayes network sensor detects the attack as of the class "portsweep". The target port lists for these alerts match, as does the attacker address. Similarity with respect to the target address depends on the order in which the alerts arrive (the order at which the alerts arrive is not deterministic as the sensors are distributed). Until the network sensor's alert is received, we do not expect target addresses to match for distinct sensors, since a host sensor can typically report only its own address as a target. We expect the network sensor's target list to contain the targets seen by host sensors (tolerating imperfect matches due to arrival order), and we expect the target address of subsequent host alerts to be contained in the meta alert's target host list. Therefore, regardless of arrival order, these alerts are acceptably similar with respect to target host.

The attacker next uses a CGI exploit to obtain the password file from the Web server. This exploit is detected by the host sensor. The next stage of the attack is a buffer overflow to gain access on the host providing mail service, detected by an EMERALD host sensor as well as by ISS.

Although telnet through the firewall is blocked, the attacker may telnet (using a password obtained from the earlier exploit) from the compromised internal host to the critical host, and he now does so. On that host, he uses another overflow attack to obtain root access. He is now free to change Web content.

Figure 6:
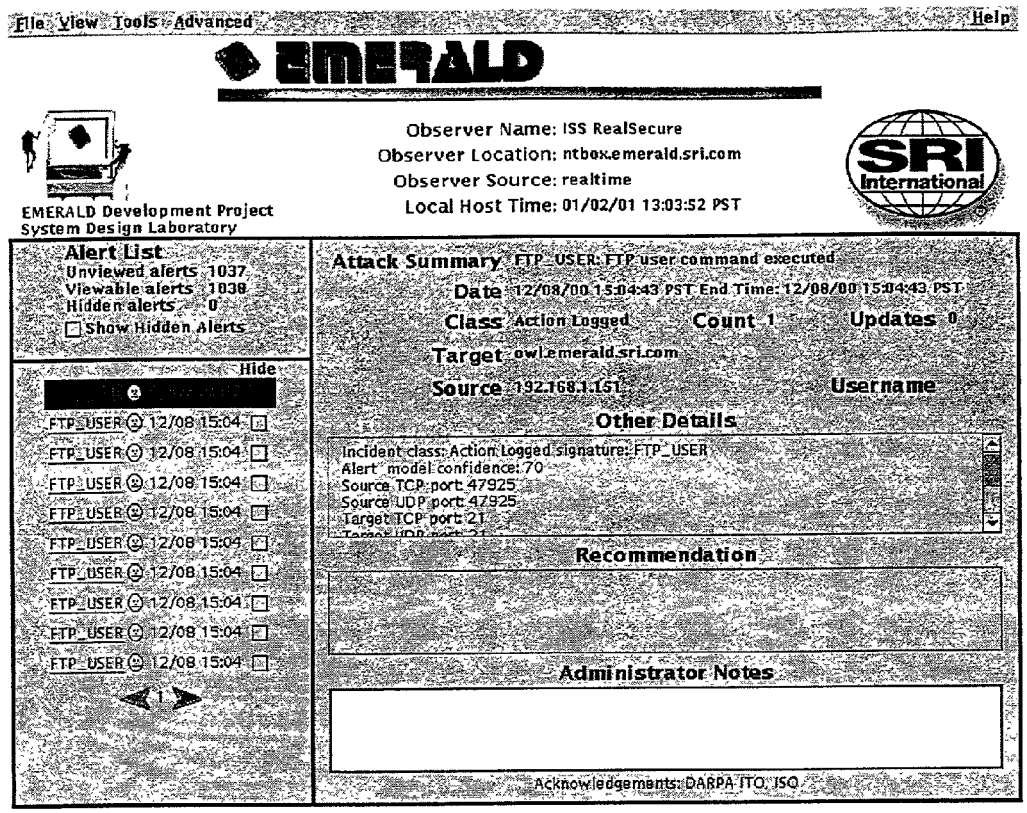
FIG. 6 is an example of a display showing a correlated attack report.

FIG. 6 shows the EMERALD alert console for this scenario, containing alert reports for the above attack steps as well as alerts due to false alarms and nuisance attacks. It is not very informative, except to show that more than 1000 alerts are received for this scenario, which lasts approximately 15 minutes, and the critical attack is effectively buried.

The majority of the alerts are from nonanonymous FTP write operations, which are allowed but trigger alerts from a commercial sensor.

Figure 7:
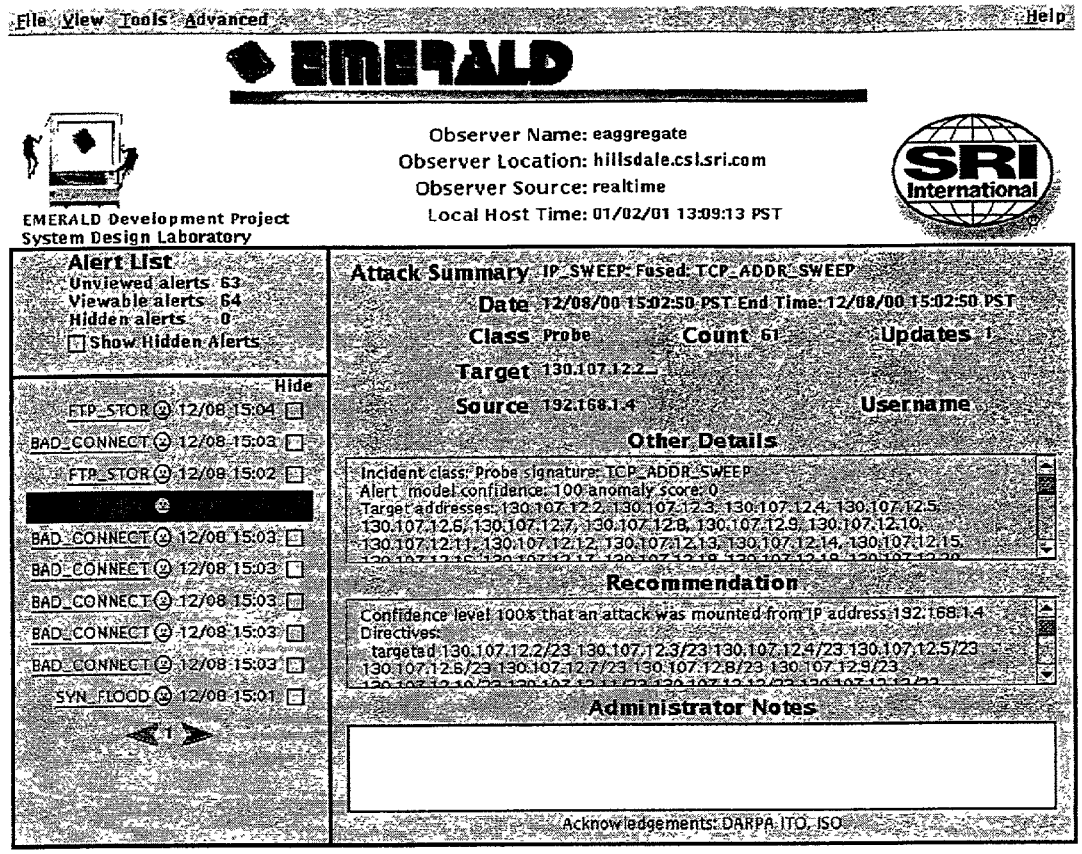
FIG. 7 is an example of a display showing raw sensor alerts.

FIG. 7 shows the result of inferring synthetic threads for sensors that do not support the threading concept. For alert thread inference, we preferably set the minimum match for sensor identifier fields to unity, and require a high match for attacker and target parameters as well; we do not require a minimum similarity in the time field to allow inference of threads that occur slowly over time. Most of the alerts are threaded into sessions according to originating IP address, and the total number of alerts reported is reduced to about sixty. We have highlighted an alert, which is one of the nuisance TCP sweep attacks in the background traffic.

For attack incident matching, we must look across sensors to determine if several alerts refer to the same security incident. We preferably suppress minimum similarity for sensors, set a moderately high similarity for attacker and target identifiers, and set a moderate minimum for time (to allow for clock drift and sensor response time differences). We may also require a match in attack class, making allowances for sensors that report different attack classes for a given attack sequence.

Figure 8:
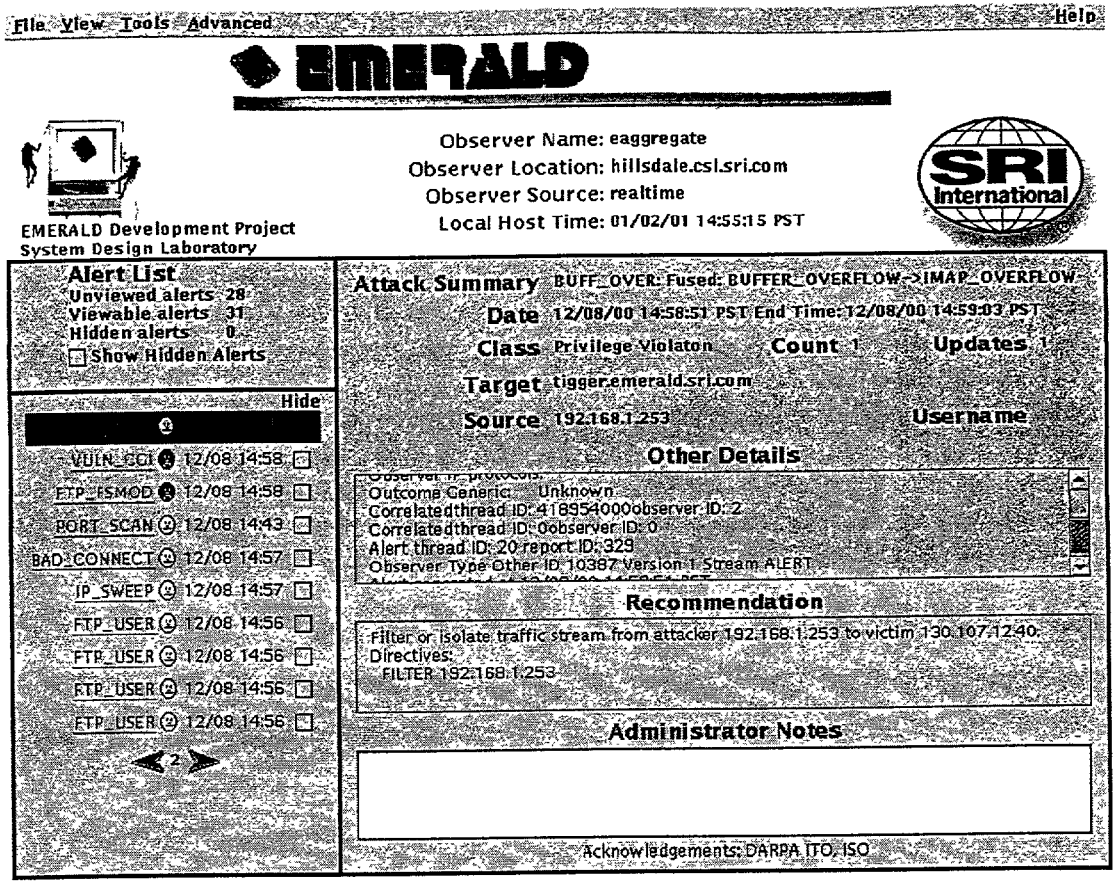
FIG. 8 is an example of a display showing the results of a preferred alert fusion process.

FIG. 8 shows the result of incident matching for the attack scenario. Some of the critical steps in the attack reported by several sensors now result in a single alert. For example, the highlighted buffer overflow attack is reported by an EMERALD sensor as well as by ISS. These are fused into a single correlated incident report. The two mscan reports from EMERALD host sensors and the portscan report from the EMERALD Bayes TCP sensor are also fused into a single incident.

Figure 9:
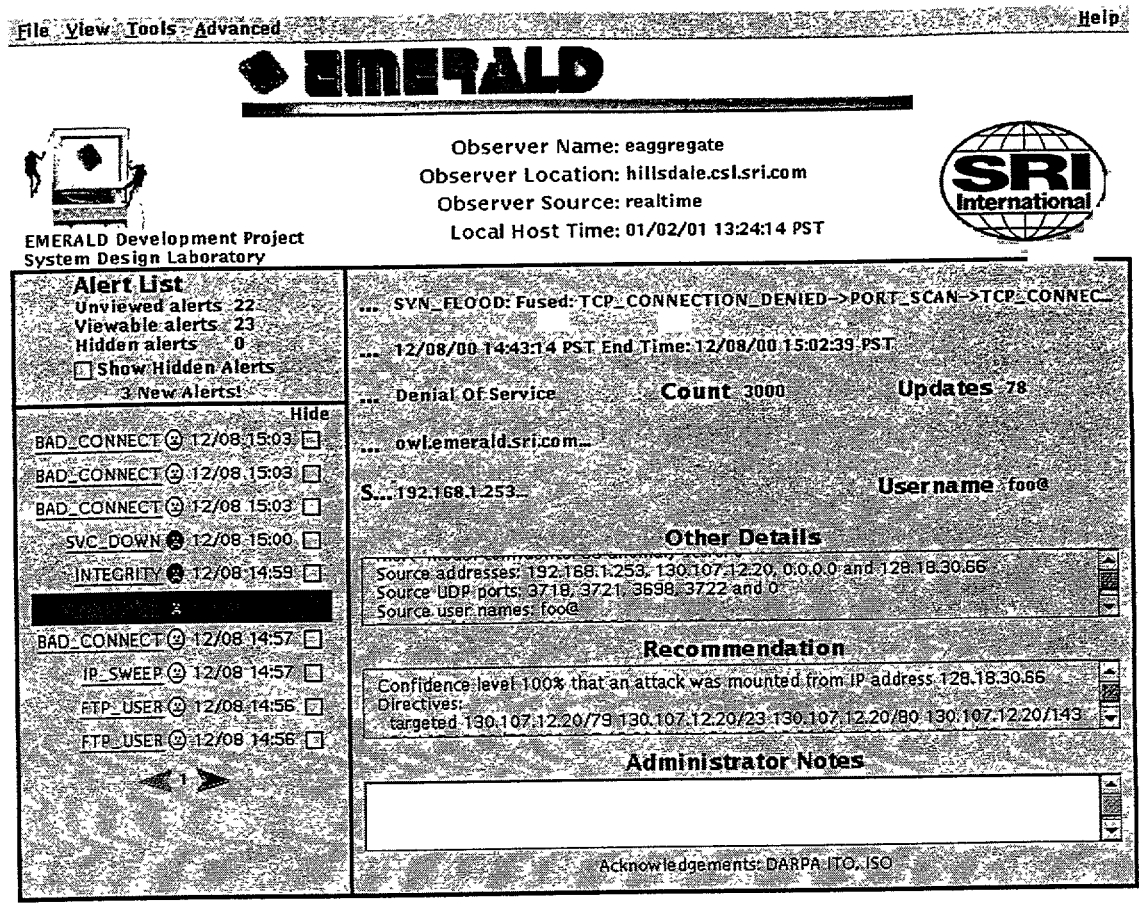
FIG. 9 is an example of a display showing the results of a preferred incident matching process.

The final step in correlation is an attempt to reconstruct the attack scenario. We now relax attack class similarity to consider what attack steps might follow the present step. For example, it is reasonable to follow a probe with an exploit to a target "contained" in the probe. Also, if the meta alert includes a step indicating a likely root compromise, the host in question is added to the attacker's assets (that is, it is both a victim and now a potential attacker as well). In FIG. 9, the correlated attack report correctly lists as attacker assets his originating host, an internal host compromised at an intermediate step, and the spoofed address of the SYN flood stage. In this fashion, we have successfully combined both the external and internal threads of the attack scenario.

It is worth pointing out that the EMERALD sensors in this experiment provide response directives which, if followed, would stop the attack in progress. We have adapted and extended notions from the field of multisensor data fusion for alert correlation. The extensions are principally in the area of generalizing feature similarity functions to comprehend observables in the intrusion detection domain. The approach has the ability to fuse alerts for which the match is good but not perfect. The method considers appropriate fields in alert reports as features for a multivariate matching algorithm. Features that overlap are considered for the overall similarity calculation. For each matchable feature, we have defined an appropriate similarity function with range 0 (mismatch) to 1 (perfect match). Depending on the situation, we incorporate expectation of match values (which are used to compute a weighted average of similarity over the overlapping features), as well as a minimum match specification that unconditionally rejects a match if any feature fails to match at the minimum specified value. For each new alert, we compute similarity to existing meta alerts, and merge the new alert with the best matching meta alert, as long as the match passes a threshold value. We realize a reduction of one-half to two-thirds in alert volume in a live environment, and approach a fiftyfold reduction in alert volume in a simulated attack scenario.

What is claimed is:

1. In an intrusion detection system that includes a plurality of sensors that generate alerts when attacks or anomalous incidents are detected, a method for organizing the alerts into alert classes, both the alerts and the alert classes having a plurality of features, the method comprising:
   (a) receiving a new alert;
   (b) identifying a set of similar features shared by the new alert and one or more existing alert classes;
   (c) updating, using a processor, a threshold similarity requirement for one or more of the similar features;
   (d) updating, using a processor, a similarity expectation for one or more of the similar features;
   (e) comparing, using a processor, the new alert with the one or more existing alert classes, using a similarity measure Sim(X,Y) that expresses a similarity between the new alert and a given one of the one or more existing alert classes, where SIM(X,Y) is defined as:

$$Sim(X, Y) = \frac{\left[\sum_{C \in X \text{ and } C \in Y} P_X(C) \times P_Y(C)\right]^2}{(P_X \cdot P_X)(P_Y \cdot P_Y)}$$

where X is a set of features and probability values for the new alert, Y is a set of features and probability values for the given one of the one or more existing alert classes, $P_X(C)$ is probability of a category C in X, $P_Y(C)$ is a probability of the category C in Y, $P_X$ is a probability vector over one or more categories observed for X, and $P_Y$ is a probability vector over one or more categories observed for Y; and either:
   (f1) associating, using a processor, the new alert with a one of the one or more existing alert classes that the new alert most closely matches according to the similarity measure; or
   (f2) defining, using a processor, a new alert class that is associated with the new alert.

2. The method of claim 1 further comprising a step (a1) of passing each of the one or more existing alert classes through a transition model to generate a new prior belief state for each of the one or more existing alert classes.

3. A computer readable storage medium containing an executable program for organizing alerts that are generated by a plurality of sensors into alert classes, both the alerts and the alert classes having a plurality of features, where the program, when executed by a processor, causes the processor to perform steps of:
   (a) receiving a new alert;
   (b) identifying a set of similar features shared by the new alert and one or more existing alert classes;
   (c) updating a threshold similarity requirement for one or more of the similar features;
   (d) updating a similarity expectation for one or more of the similar features;
   (e) comparing the new alert with the one or more existing alert classes, using a similarity measure Sim(X,Y) that expresses a similarity between the new alert and a given one of the one or more existing alert classes, where SIM(X,Y) is defined as:

$$Sim(X, Y) = \frac{\left[\sum_{C \in X \text{ and } C \in Y} P_X(C) \times P_Y(C)\right]^2}{(P_X \cdot P_X)(P_Y \cdot P_Y)}$$

where X is a set of features and probability values for the new alert, Y is a set of features and probability values for the given one of the one or more existing alert classes, $P_X(C)$ is a probability of a category C in X, $P_Y(C)$ is a probability of the category C in Y, $P_X$ is a probability vector over one or more categories observed for X, and $P_Y$ is a probability vector over one or more categories observed for Y; and either:

- (f1) associating the new alert with a one of the one or more existing alert classes that the new alert most closely matches according to the similarity measure; or
- (f2) defining a new alert class that is associated with the new alert.

4. The computer readable storage medium of claim 3 further comprising a step (a1) of passing each of the one or more existing alert classes through a transition model to generate a new prior belief state for each of the one or more existing alert classes.

5. In an intrusion detection system that includes a plurality of sensors that generate alerts when attacks or anomalous incidents are detected, a system for organizing the alerts into alert classes, both the alerts and the alert classes having a plurality of features, where the system comprises:

- (a) means for receiving a new alert;
- (b) means for identifying a set of similar features shared by the new alert and one or more existing alert classes;
- (c) means for updating a threshold similarity requirement for one or more of the similar features;
- (d) means for updating a similarity expectation for one or more of the similar features;
- (e) means for comparing the new alert with the one or more existing alert classes, using a similarity measure Sim(X, Y) that expresses a similarity between the new alert and a given one of the one or more existing alert classes, where SIM(X,Y) is defined as:

$$Sim(X, Y) = \frac{\left[\sum_{C \in X \text{ and } C \in Y} P_X(C) \times P_Y(C)\right]^2}{(P_X \cdot P_X)(P_Y \cdot P_Y)}$$

where X is a set of features and probability values for the new alert, Y is a set of features and probability values for the given one of the one or more existing alert classes, $P_X(C)$ is a probability of a category C in X, $P_Y(C)$ is a probability of the category C in Y, $P_X$ is a probability vector over one or more categories observed for X, and $P_Y$ is a probability vector over one or more categories observed for Y; and

- (f1) means for associating the new alert with a one of the one or more existing alert classes that the new alert most closely matches according to the similarity measure, or defining a new alert class that is associated with the new alert.

6. The system of claim 5 further comprising (a1) means for passing each of the one or more existing alert classes through a transition model to generate a new prior belief state for each of the one or more existing alert classes.

* * * * *